(12) United States Patent
Mertesdorf

(10) Patent No.: US 9,014,527 B2
(45) Date of Patent: Apr. 21, 2015

(54) RACK AND CHASSIS FOR FIBER OPTIC SLIDING ADAPTER MODULES

(75) Inventor: Daniel Ray Mertesdorf, Tehachapi, CA (US)

(73) Assignee: ADC Telecommunication, Inc., Berwyn, PA (US)

( * ) Notice: Subject to any disclaimer, the term of this patent is extended or adjusted under 35 U.S.C. 154(b) by 224 days.

(21) Appl. No.: 13/455,318

(22) Filed: Apr. 25, 2012

(65) Prior Publication Data

US 2013/0108231 A1 May 2, 2013

Related U.S. Application Data

(60) Provisional application No. 61/478,775, filed on Apr. 25, 2011.

(51) Int. Cl.
| | |
|---|---|
| *G02B 6/00* | (2006.01) |
| *G02B 6/46* | (2006.01) |
| *G02B 6/38* | (2006.01) |
| *G02B 6/44* | (2006.01) |

(52) U.S. Cl.
CPC ............. *G02B 6/46* (2013.01); *G02B 6/3825* (2013.01); *G02B 6/4452* (2013.01); *G02B 6/3897* (2013.01)

(58) Field of Classification Search
CPC ...... G02B 6/4452; G02B 6/46; G02B 6/4471; G02B 6/4455
USPC .......................... 385/134, 135, 136, 137, 139
See application file for complete search history.

(56) References Cited

U.S. PATENT DOCUMENTS

| | | | |
|---|---|---|---|
| 4,359,262 | A | 11/1982 | Dolan |
| 4,502,754 | A | 3/1985 | Kawa |
| 4,585,303 | A | 4/1986 | Pinsard et al. |
| 4,595,255 | A | 6/1986 | Bhatt et al. |
| 4,630,886 | A | 12/1986 | Lauriello et al. |
| 4,699,455 | A | 10/1987 | Erbe et al. |
| 4,708,430 | A | 11/1987 | Donaldson et al. |
| 4,717,231 | A | 1/1988 | Dewez et al. |
| 4,765,710 | A | 8/1988 | Burmeister et al. |
| 4,792,203 | A | 12/1988 | Nelson et al. |
| 4,971,421 | A | 11/1990 | Ori |
| 4,986,762 | A | 1/1991 | Keith |

(Continued)

FOREIGN PATENT DOCUMENTS

| | | |
|---|---|---|
| AU | 40995/85 | 4/1985 |
| AU | 55314/86 | 3/1986 |

(Continued)

OTHER PUBLICATIONS

International Search Report and Written Opinion for PCT/US2012/035000 mailed Nov. 28, 2012.

(Continued)

*Primary Examiner* — Jennifer Doan
(74) *Attorney, Agent, or Firm* — Merchant & Gould P.C.

(57) ABSTRACT

A fiber optic adapter module is disclosed. The fiber optic adapter module includes a molded one-piece housing including a first end and a second end, the housing including a plurality of passages extending from the first end to the second end, each passage configured to interconnect two cables terminated with fiber optic connectors. The housing is movably mounted on a fixture, wherein the module is movable relative to the fixture along a line of travel that is non-parallel to longitudinal axes of the openings.

27 Claims, 34 Drawing Sheets

(56) References Cited

U.S. PATENT DOCUMENTS

| | | | |
|---|---|---|---|
| 4,995,688 | A | 2/1991 | Anton et al. |
| 5,100,221 | A | 3/1992 | Carney et al. |
| 5,129,030 | A | 7/1992 | Petrunia |
| 5,138,688 | A | 8/1992 | Debortoli |
| 5,142,606 | A | 8/1992 | Carney et al. |
| 5,142,806 | A | 9/1992 | Swan |
| 5,160,188 | A | 11/1992 | Rorke et al. |
| 5,167,001 | A | 11/1992 | Debortoli et al. |
| 5,289,558 | A | 2/1994 | Teichler et al. |
| 5,318,259 | A | 6/1994 | Fussler |
| 5,335,349 | A | 8/1994 | Kutsch et al. |
| 5,353,367 | A | 10/1994 | Czosnowski et al. |
| 5,363,467 | A | 11/1994 | Keith |
| 5,402,515 | A | 3/1995 | Vidacovich et al. |
| 5,412,751 | A | 5/1995 | Siemon et al. |
| 5,488,705 | A * | 1/1996 | LaBarbera ............... 710/305 |
| 5,490,229 | A | 2/1996 | Ghandeharizadeh et al. |
| 5,497,444 | A | 3/1996 | Wheeler |
| 5,511,144 | A | 4/1996 | Hawkins et al. |
| 5,570,450 | A | 10/1996 | Fernandez et al. |
| 5,717,810 | A | 2/1998 | Wheeler |
| 5,758,003 | A | 5/1998 | Wheeler et al. |
| 6,097,872 | A | 8/2000 | Kusuda et al. |
| 6,236,795 | B1 | 5/2001 | Rodgers |
| 6,360,050 | B1 | 3/2002 | Moua et al. |
| 6,591,051 | B2 | 7/2003 | Solheid et al. |
| RE38,311 | E | 11/2003 | Wheeler |
| 7,416,349 | B2 | 8/2008 | Kramer |
| 7,583,883 | B2 | 9/2009 | Kowalczyk et al. |
| RE41,460 | E | 7/2010 | Wheeler |
| 8,690,593 | B2 | 4/2014 | Anderson et al. |
| 2003/0095772 | A1 | 5/2003 | Solheid et al. |
| 2008/0175550 | A1 | 7/2008 | Coburn et al. |
| 2009/0232455 | A1 | 9/2009 | Nhep |
| 2010/0129028 | A1 | 5/2010 | Nhep et al. |
| 2010/0129039 | A1 | 5/2010 | Smrha et al. |
| 2011/0262077 | A1 | 10/2011 | Anderson et al. |

FOREIGN PATENT DOCUMENTS

| | | |
|---|---|---|
| DE | 27 35 106 A1 | 2/1979 |
| DE | 33 08 682 A1 | 9/1984 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| FR | 2 531 576 A1 | 2/1984 |
| FR | 2 587 127 A1 | 3/1987 |
| JP | 59-74523 | 4/1984 |
| JP | 60-169811 | 9/1985 |
| JP | 61-55607 | 3/1986 |
| JP | 61-90104 | 5/1986 |
| WO | WO 91/10927 | 7/1991 |
| WO | WO 2007/015868 A1 | 2/2007 |

OTHER PUBLICATIONS

"ITU Fiber Handbook" with English Translation, 14 pages, Mar. 1992.
"Precision Mechanical" with English Translation, 5 pages, 2014.
AT&T Product Bulletin 2987D-DLH-7/89 Issue 2 (Copyright 1989).
Northern Telecom bulletin #91-004, Issue #2, May 1991.
Value-Added Module (VAM) System, 5th Edition, ADC Telecommunications, Inc., 32 pages. (Oct. 2009).
Complaint relating to Civil Action No. 5:11-cv-02509-JS, *ADC Telecommunications, Inc* v. *Opterna Am, Inc.* filed Apr. 11, 2011 (14 pages).
Plaintiff's Notice of Dismissal relating to Civil Action No. 5:11-cv-02509-JS, *ADC Telecommunications, Inc* v. *Opterna Am, Inc.* filed Jul. 12, 2011 (1 page).
Complaint relating to Civil Action No. 1:11cv-735 (GBL-IDD), *ADC Telecommunications, Inc* v. *Opterna Am, Inc.* filed Jul. 12, 2011 (5 pages).
Stipulation and Order of Dismissal relating to Civil Action No. 1:11-cv-735-GBL-IDD, *ADC Telecommunications, Inc* v. *Opterna Am, Inc.* filed Feb. 21, 2012 (2 pages).

* cited by examiner

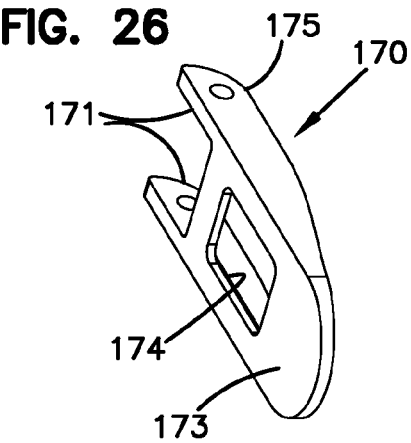
FIG. 26
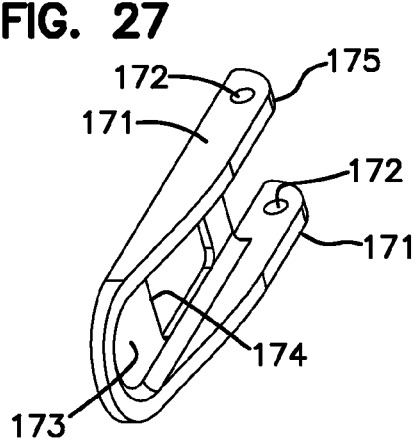
FIG. 27
FIG. 28
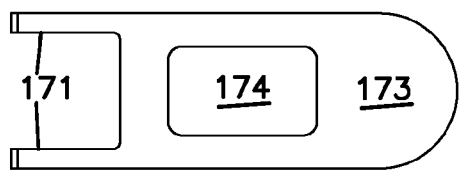
FIG. 29
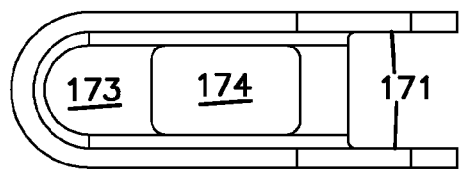
FIG. 30
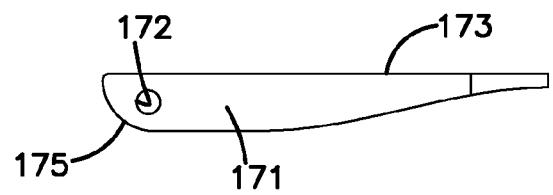

RACK AND CHASSIS FOR FIBER OPTIC SLIDING ADAPTER MODULES

CROSS-REFERENCE TO RELATED APPLICATIONS

This applications claims the benefit of U.S. Provisional Application No. 61/478,775, filed Apr. 25, 2011, and titled "Fiber Optic Sliding Adapter Modules," the disclosure of which is hereby incorporated herein by reference.

TECHNICAL FIELD

The present disclosure relates generally to fiber optic telecommunications equipment. More specifically, the present disclosure relates to a fiber optic adapter module, a chassis for holding the fiber optic adapter module, and a rack configured for holding the same.

BACKGROUND

In telecommunications industry, the demand for added capacity is growing rapidly. This demand is being met in part by the increasing use and density of fiber optic transmission equipment. Even though fiber optic equipment permits higher levels of transmission in the same or smaller footprint than traditional copper transmission equipment, the demand requires even higher levels of fiber density. This has led to the development of high-density fiber handling equipment.

An example of this type of equipment is found in U.S. Pat. No. 6,591,051 (the '051 patent) assigned to ADC Telecommunications, Inc. This patent concerns a high-density fiber distribution frame and high-density fiber termination blocks (FTBs) which are mounted to the frame. Because of the large number of optical fibers passing into and out of the FTBs, the frame and blocks have a variety of structures to organize and manage the fibers. Some structures are used to aid the fibers entering the back of the frame and FTBs. Other structures are provided for managing the cables leaving the FTBs on the front. The FTBs also include structures for facilitating access to the densely packed terminations. One such structure is a slidable adapter module that is incorporated into the FTBs to allow selective access to the densely packed terminations inside the FTBs.

Further development in such fiber termination systems is desired.

SUMMARY

The present disclosure relates to a fiber optic telecommunications device. The telecommunications device includes a fiber optic adapter module. The adapter module defines a generally one-piece block of adapters for optically connecting fiber optic cables terminated with connectors. The block defines a plurality of openings for forming an integral array of adapters.

According to one inventive aspect, the block is configured for slidable movement relative to a fixture to which it is mounted thereon for providing access to the array of adapters and connectors.

According to another inventive aspect, the fiber optic adapter module includes a molded one-piece housing including a first end and a second end, the housing including at least one opening extending from the first end to the second end, each opening defining a separate fiber optic adapter for interconnecting two cables terminated with fiber optic connectors. The housing is movably mounted on a fixture, wherein the module is movable relative to the fixture along a line of travel that is non-parallel to longitudinal axes of the openings. The fiber optic adapter also includes a sleeve mount mounted within each of the openings of the housing. The sleeve mount is configured to be inserted into the opening in a direction extending from the first end to the second end, generally parallel to the longitudinal axis of the opening.

A variety of additional inventive aspects will be set forth in the description that follows. The inventive aspects can relate to individual features and combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 26 is a top, rear view of an example handle suitable for use with the adapter modules disclosed herein;

FIG. 27 is a bottom, rear view of the example handle of FIG. 26;

FIG. 28 is a top plan view of the example handle of FIG. 26;

FIG. 29 is a bottom plan view of the example handle of FIG. 26;

FIG. 30 is a side elevational view of the example handle of FIG. 26;

DETAILED DESCRIPTION

Reference will now be made in detail to examples of inventive aspects of the present disclosure which are illustrated in the accompanying drawings. Wherever possible, the same reference numbers will be used throughout the drawings to refer to the same or like parts.

Figure 1:
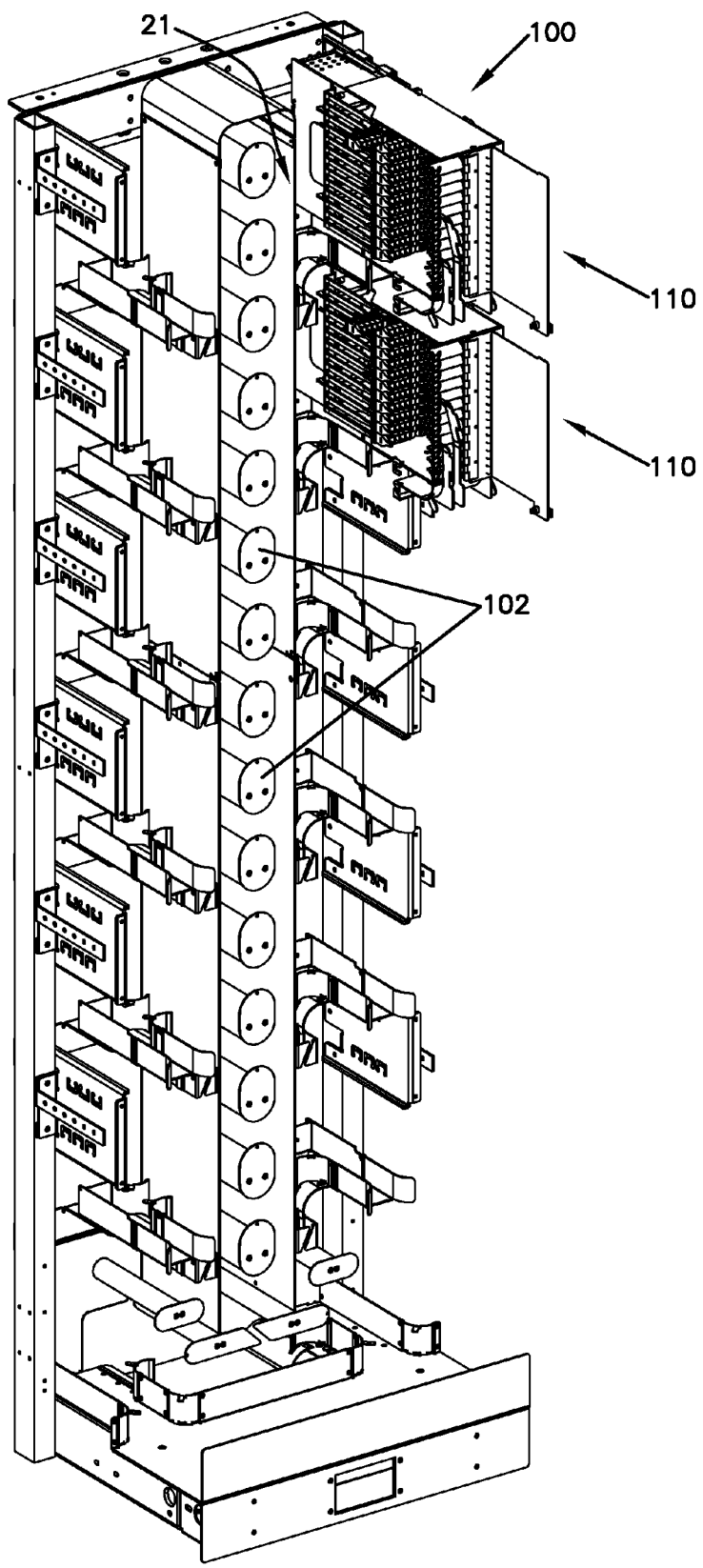
FIG. 1 is a front perspective view of a high-density fiber distribution frame having features that are examples of inventive aspects in accordance with the principles of the present disclosure, the high-density fiber distribution frame shown with two fiber termination blocks mounted thereon, the fiber termination arrangements having features that are examples of inventive aspects in accordance with the principles of the present disclosure.

A high-density distribution frame 100 and two high-density fiber termination blocks 110 having features that are examples of inventive aspects in accordance with the principles of the present disclosure are illustrated in FIG. 1. A similar high-density distribution frame 100 is described in U.S. Pat. No. 6,591,051, the disclosure of which is incorporated by reference.

Referring to FIG. 1, the fiber distribution frame 100 is adapted to receive two vertical rows of six of the fiber termination arrangements 110, two of which are shown mounted in FIG. 1. Similar fiber termination arrangements are also described in the '051 patent. Located intermediately between these two rows of fiber termination arrangements 110 is a jumper storage trough 102 that defines a series of spools for organizing and storing excess slack in cross-connect cables used to link between optical fiber terminations inside the fiber termination arrangements 110.

Figure 2:
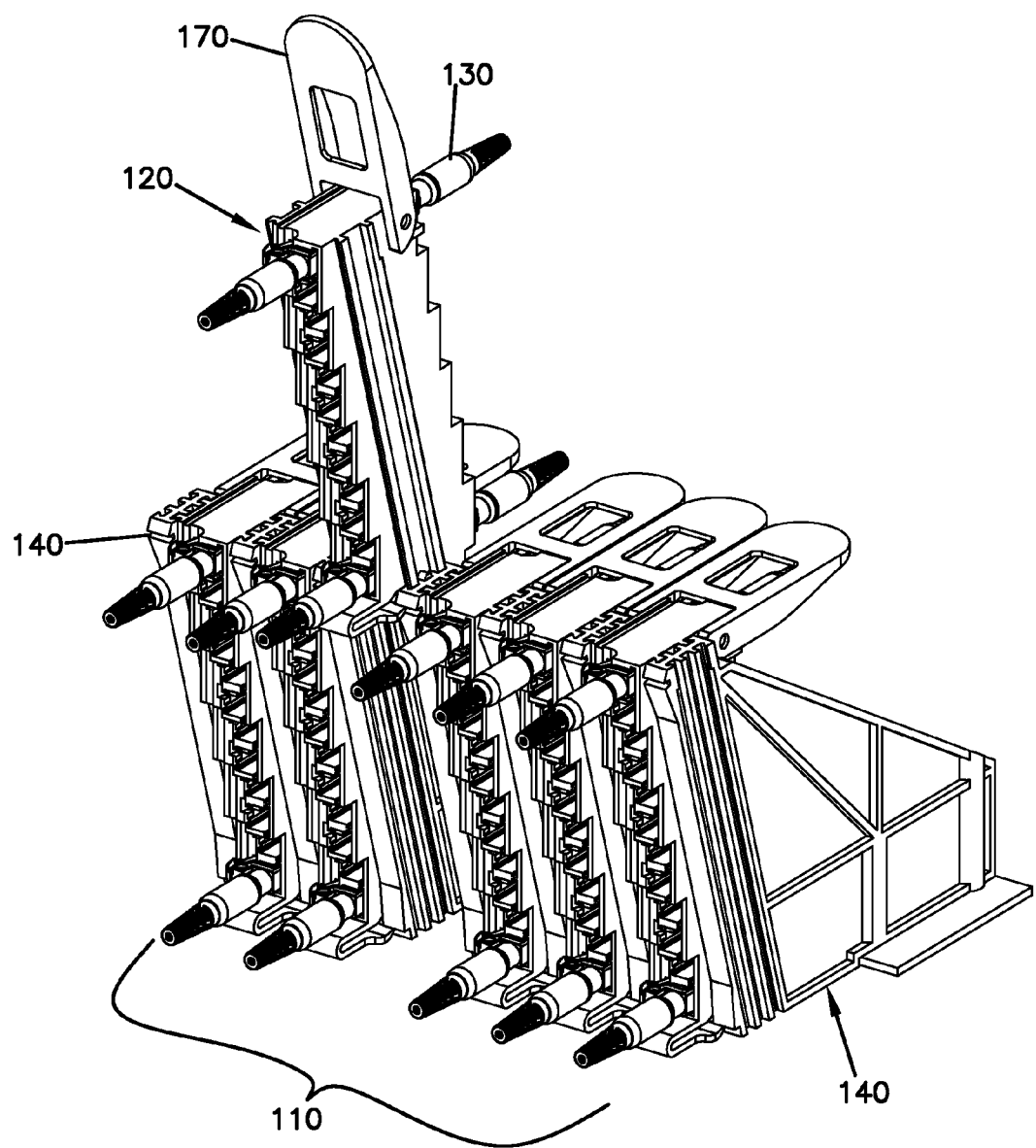
FIG. 2 is a front, top perspective view of an example termination arrangement including sliding adapter modules with one of the adapter modules in an extended position and five of the adapter modules in non-extended positions.
Figure 3:
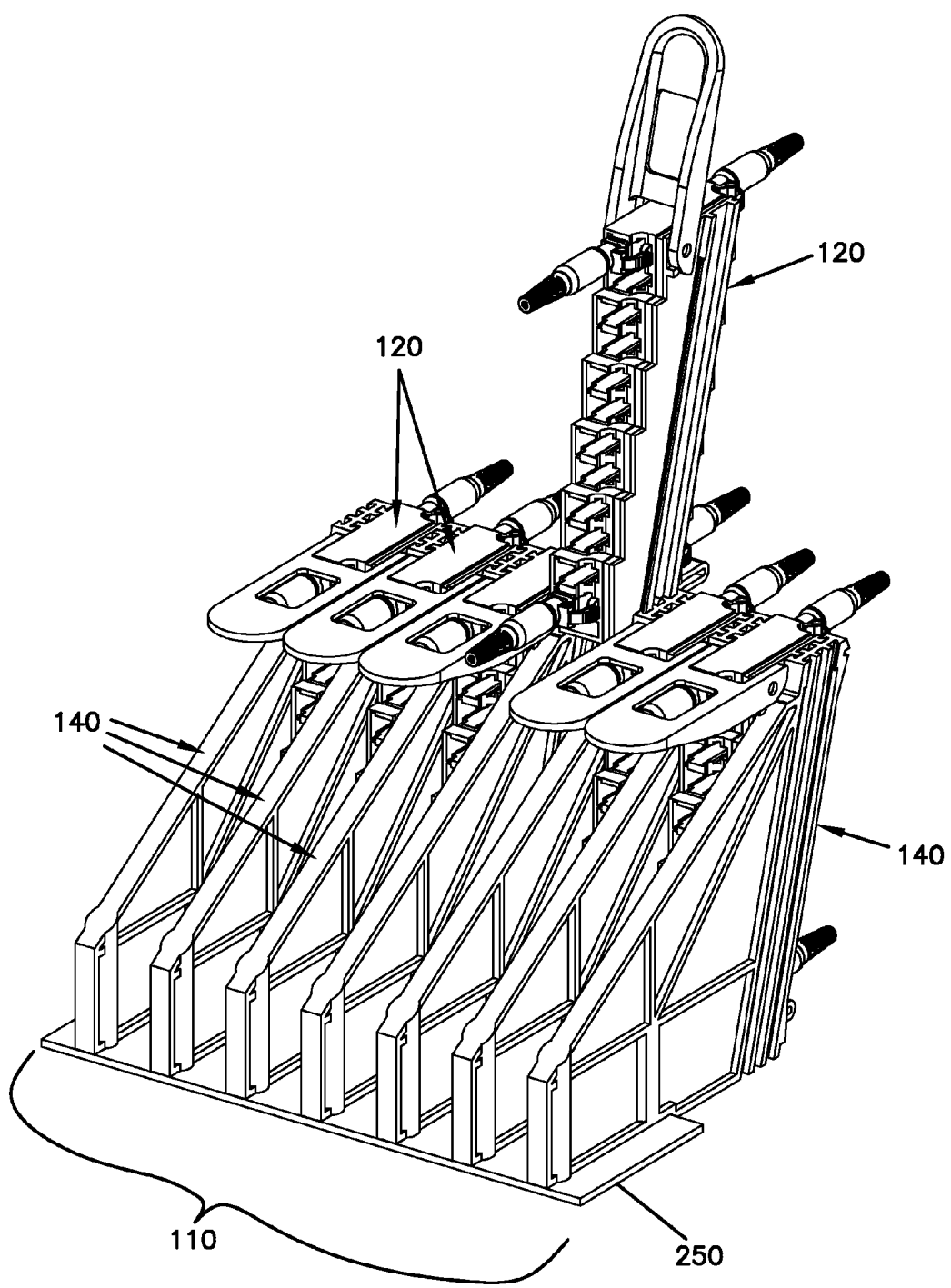
FIG. 3 is a rear, top view of the termination arrangement of FIG. 2.
Figure 6:
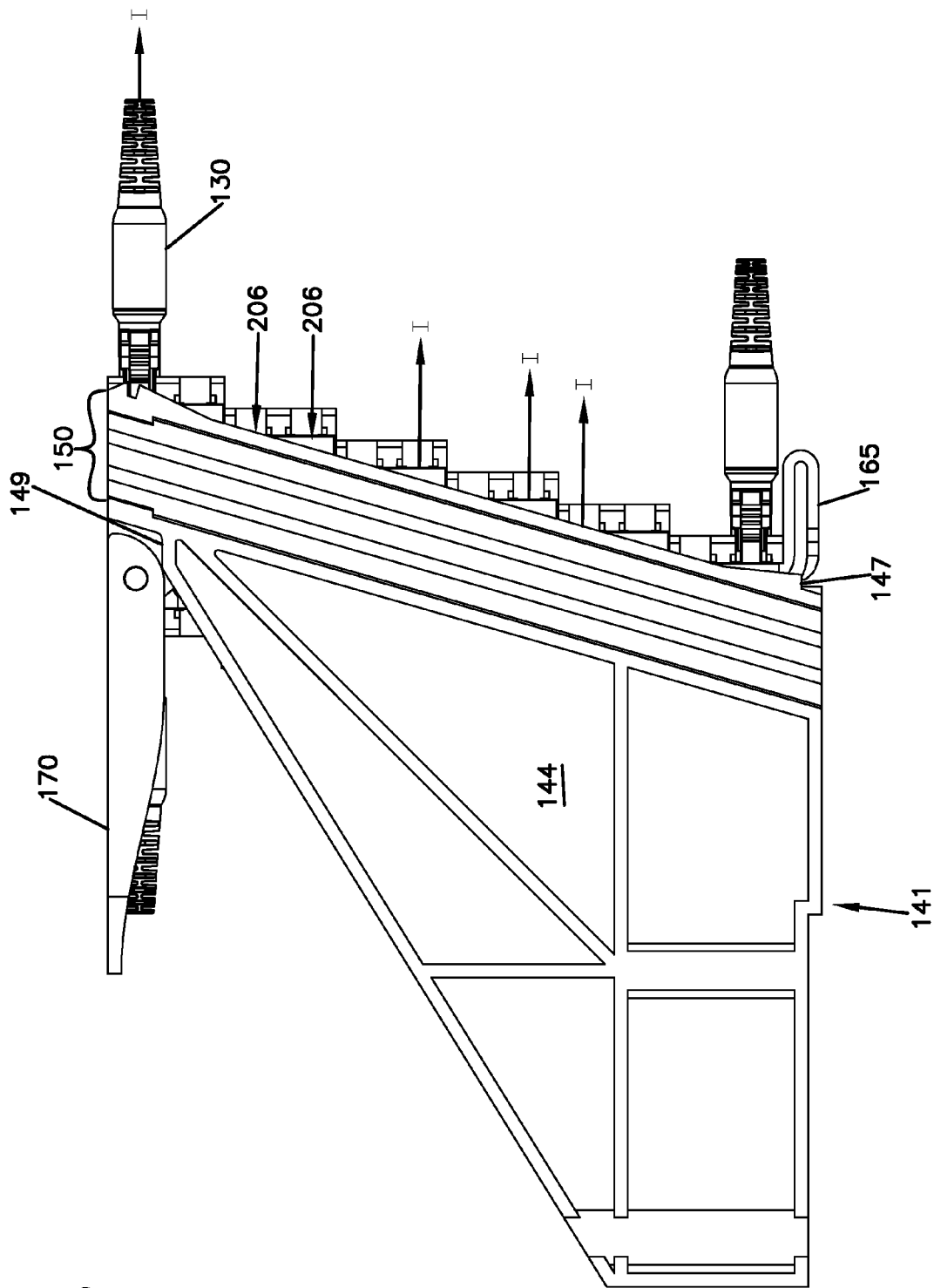
FIGS. 6 and 7 are side elevational views of the example adapter module and walls of FIG. 4.
Figure 7:
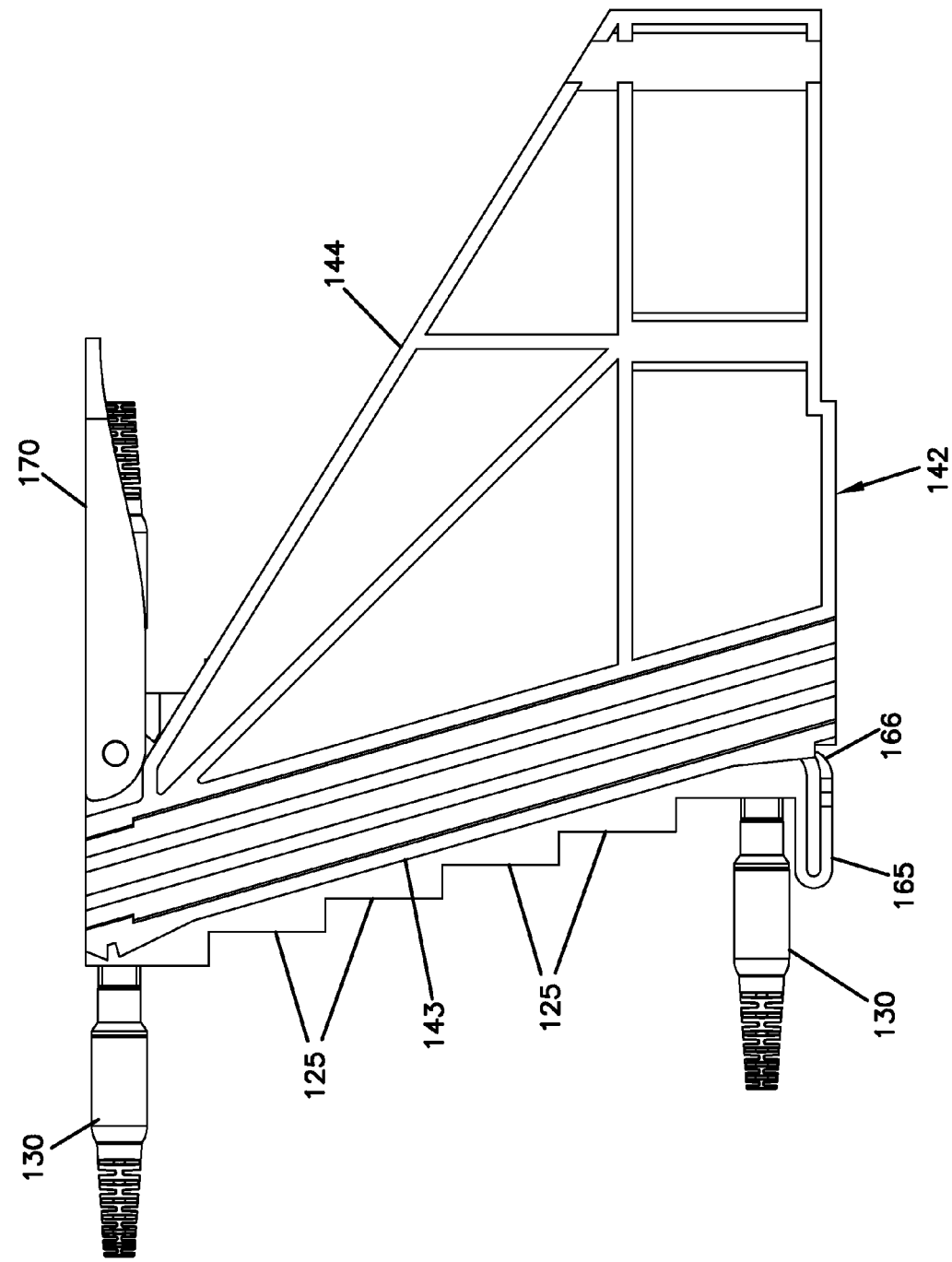
Figure 9:
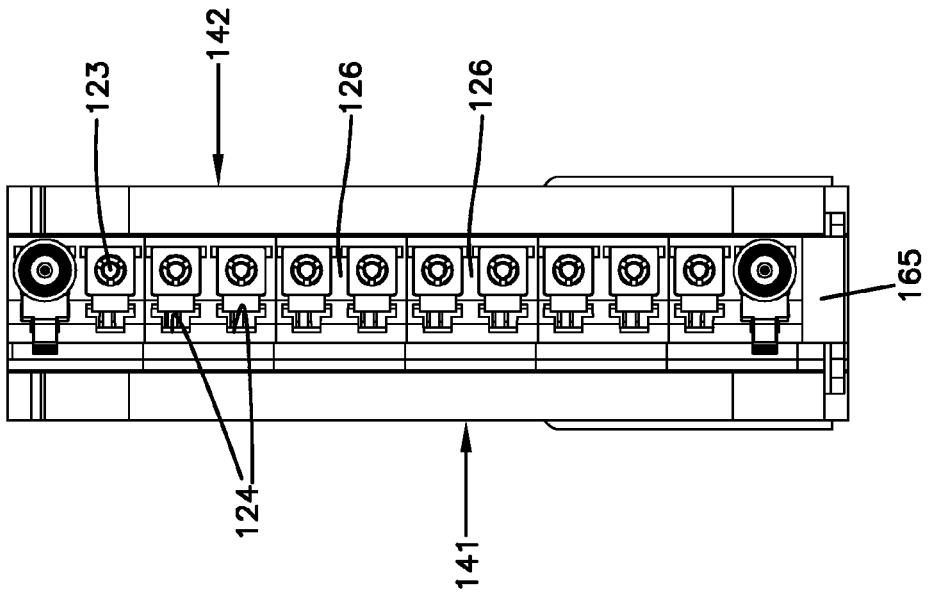
FIG. 9 is a front elevational view of the example adapter module and walls of FIG. 4.
Figure 8:
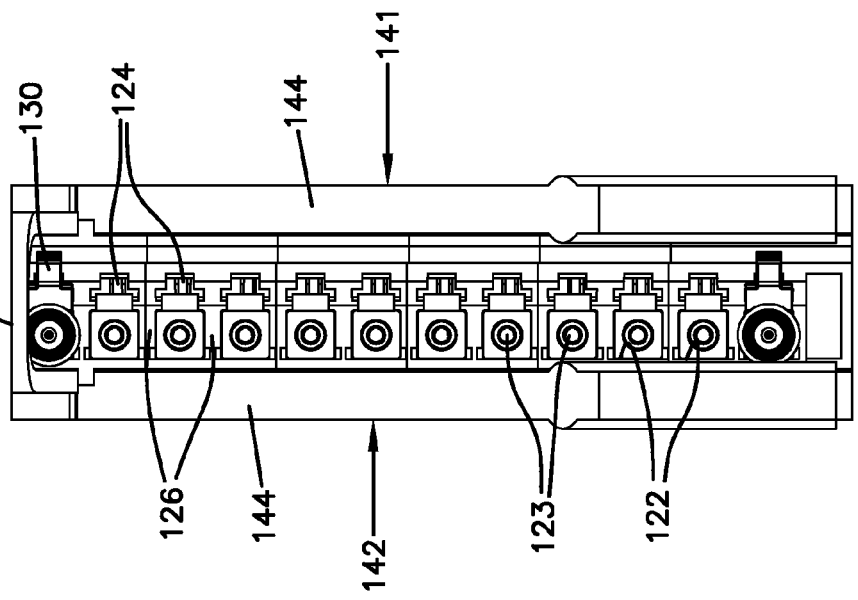
FIG. 8 is a rear elevational view of the example adapter module and walls of FIG. 4.
Figure 10:
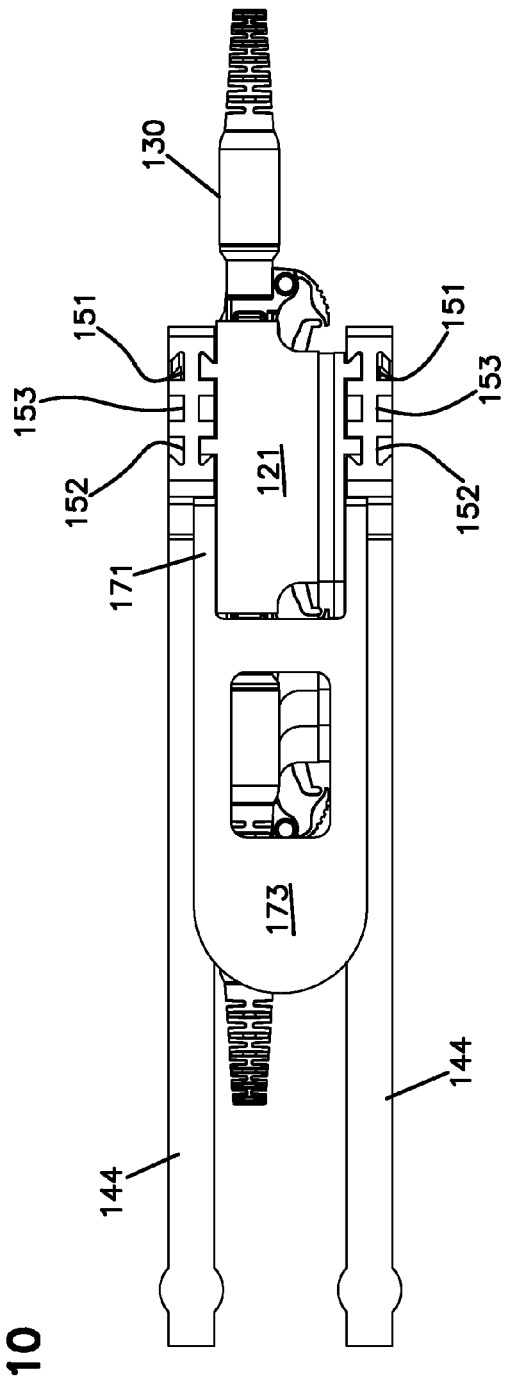
FIG. 10 is a top plan view of the example adapter module and walls of FIG. 4.
Figure 11:
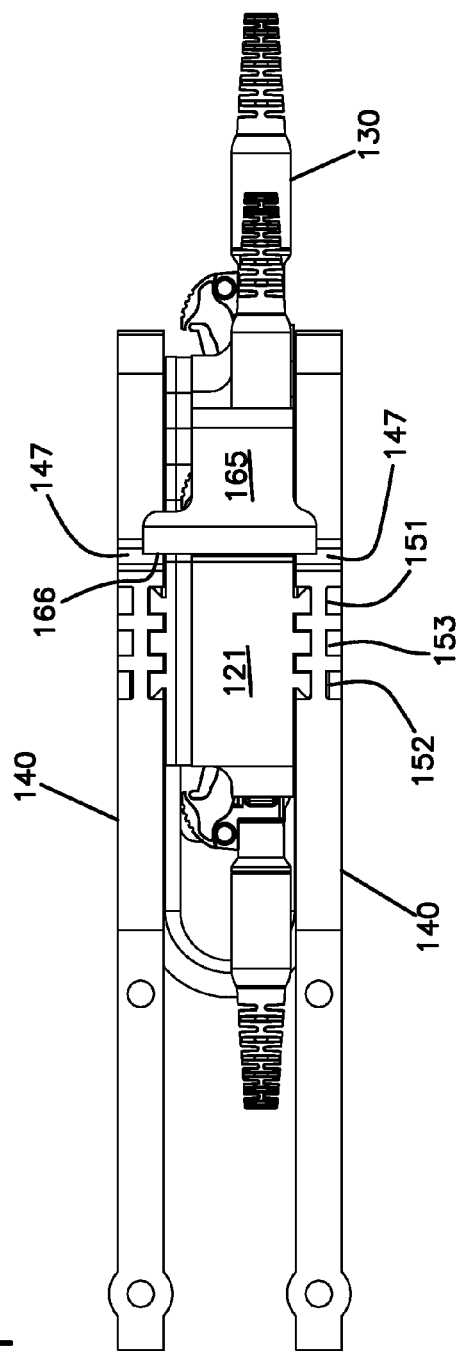
FIG. 11 is a bottom plan view of the example adapter module and walls of FIG. 4.
Figure 12:
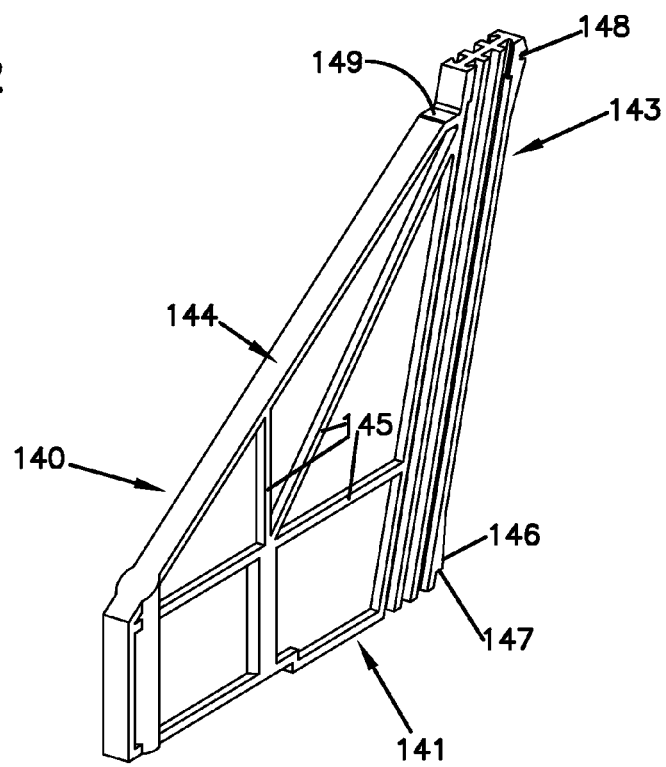
FIG. 12 is a top, rear view of an example wall suitable for use with the adapter modules disclosed herein.
Figure 13:
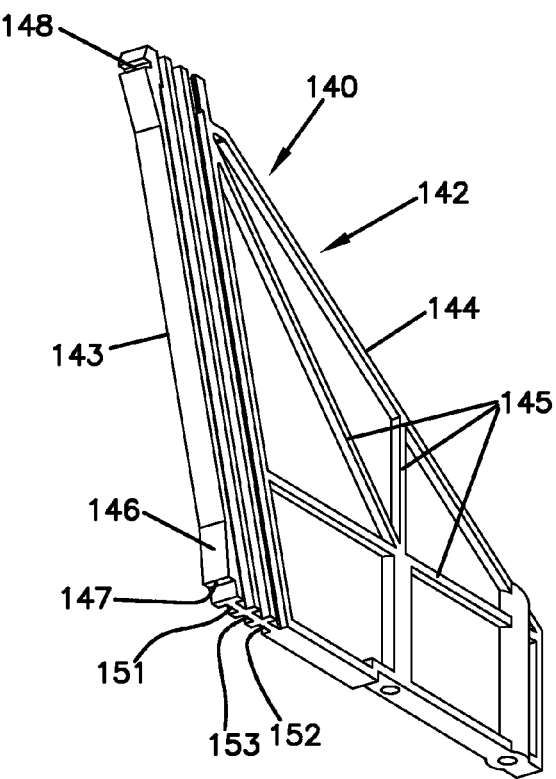
FIG. 13 is a bottom, front view of the example wall of FIG. 12.
Figure 15:
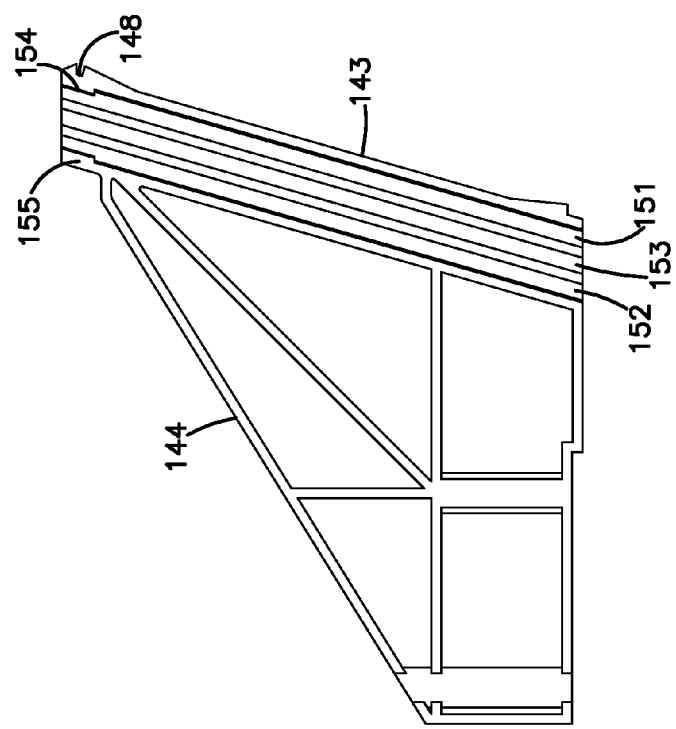
FIGS. 14 and 15 are side elevational views of the example wall of FIG. 12.
Figure 14:
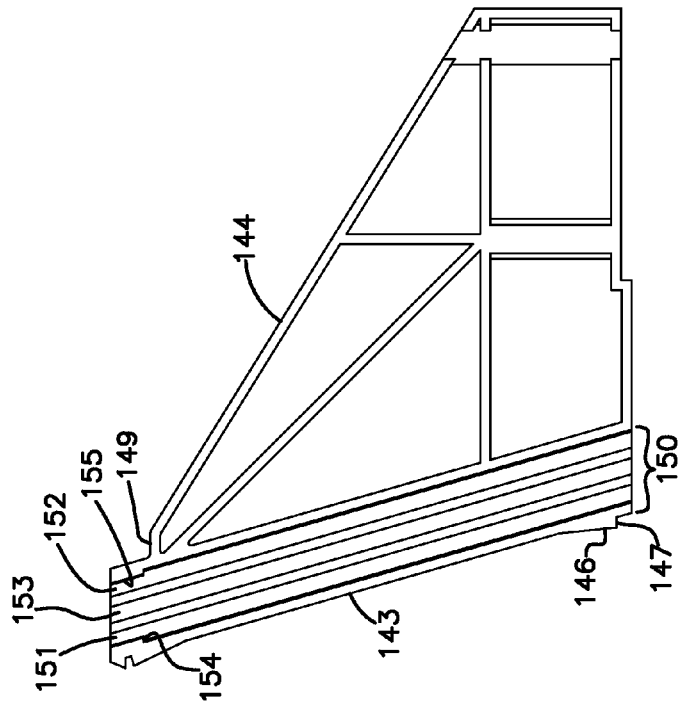
Figure 16:
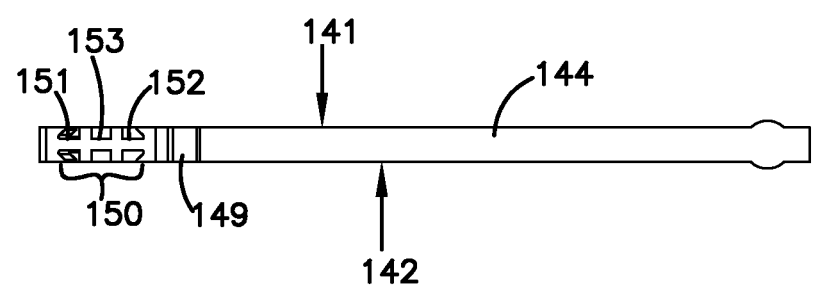
FIG. 16 is a top plan view of the example wall of FIG. 12.
Figure 17:
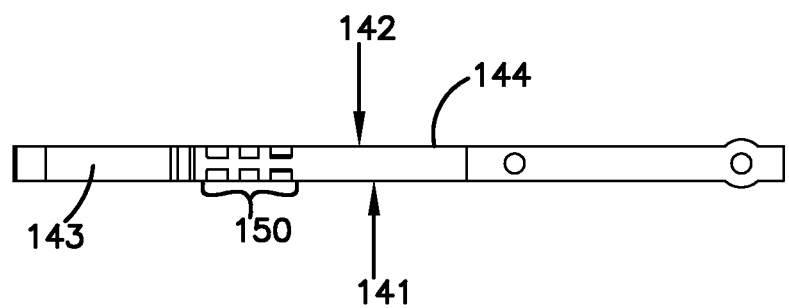
FIG. 17 is a bottom plan view of the example wall of FIG. 12.
Figure 18:
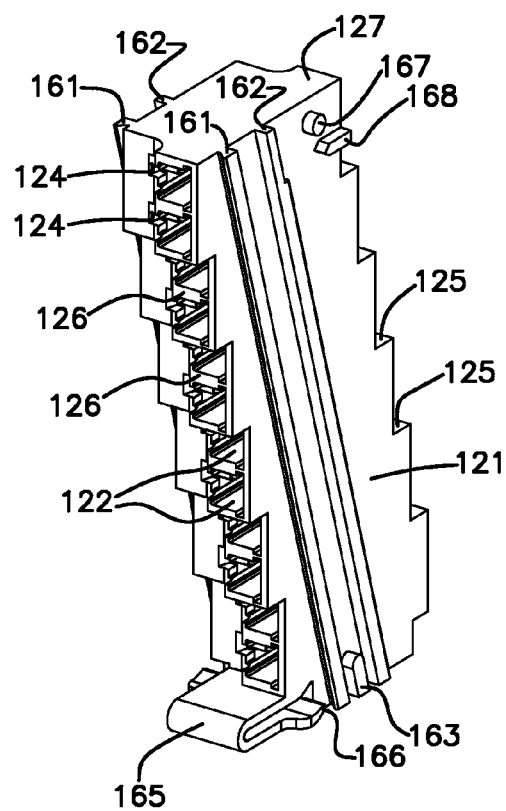
FIG. 18 is a top, front view of a first example adapter module configured in accordance with the principles of the present disclosure.
Figure 19:
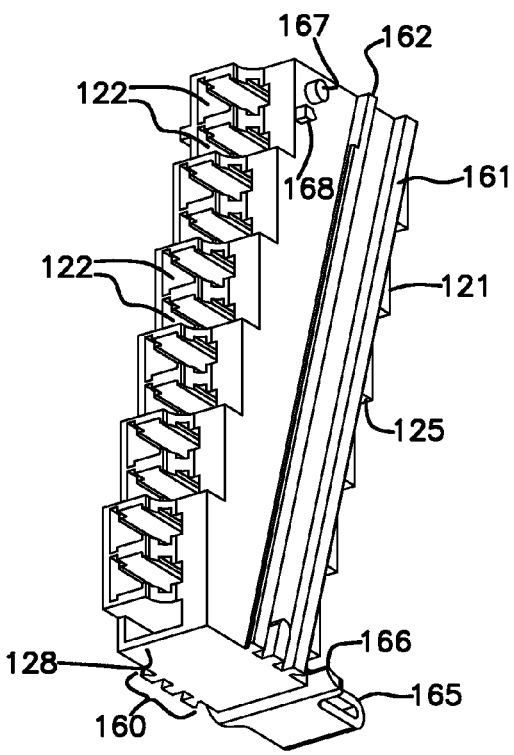
FIG. 19 is a bottom, rear view of the first example adapter module of FIG. 18.

FIGS. 2 and 3 illustrate one example implementation of a fiber termination arrangement 110 having features that are examples of inventive aspects in accordance with the principles of the present disclosure. Each fiber termination arrangement 110 includes a plurality of sliding adapter modules 120 and walls 140 having features that are examples of inventive aspects in accordance with the principles of the present disclosure. The sliding adapter modules 120 are configured to slide along the walls 140 between non-extended positions and extended positions to provide selective access to fiber optic connectors 130 mounted thereat. The adapter modules 120 slide in a direction generally non-parallel to the longitudinal axes A of the connectors mounted on the modules (see FIG. 6).

Each of the adapter modules 120 is separately slideable relative to the other adapter modules 120. In the example shown in FIGS. 2 and 3, the fiber termination arrangement 110 includes six sliding adapter modules 120 mounted between seven walls 140. Five the adapter modules 120 are in the non-extended positions and one of the adapter modules 120 is in the extended position. Moving the adapter module 120 to the extended position facilitates access to any connectors 130 held at the adapter module 120.

Referring now to FIGS. 5-11, the sliding adapter module 120 is shown slidably mounted on a pair of walls 140 that cooperatively form a track for the slidable adapter module 120. In FIGS. 5-11, the sliding adapter module 120 is shown in a retracted position relative to the walls 140.

Each wall 140 is designed to provide slidability for the adapter module 120. In FIGS. 12-17, one example wall 140 is shown in closer detail. Each wall 140 has a first side 141 and a second side 142. In certain implementations, the first and second sides 141, 142 are generally identical. Each wall 140 also includes a guiding section 143 and a support section 144. In some implementations, a guiding section 143 is formed on each side 141, 142. The support section 144 includes one or more ribs 145 that provide structural support for the wall 140.

The guiding section 143 includes a latching member adjacent a first end. The latching member defines a ramp 146 and a shoulder 147. The shoulder 147 faces the first end at a position spaced from the first end. In some implementations, a second end of the guiding section 143 includes a notched tab 148. The intersection of the support section 144 and the guiding section 143 at the second end of the guiding section 143 defines a shoulder 149. One end of the support section 144 also defines fastener openings 159 for mounting the walls 140 to a telecommunications device, such as a panel or a fiber termination block (see FIG. 1).

Figure 4:
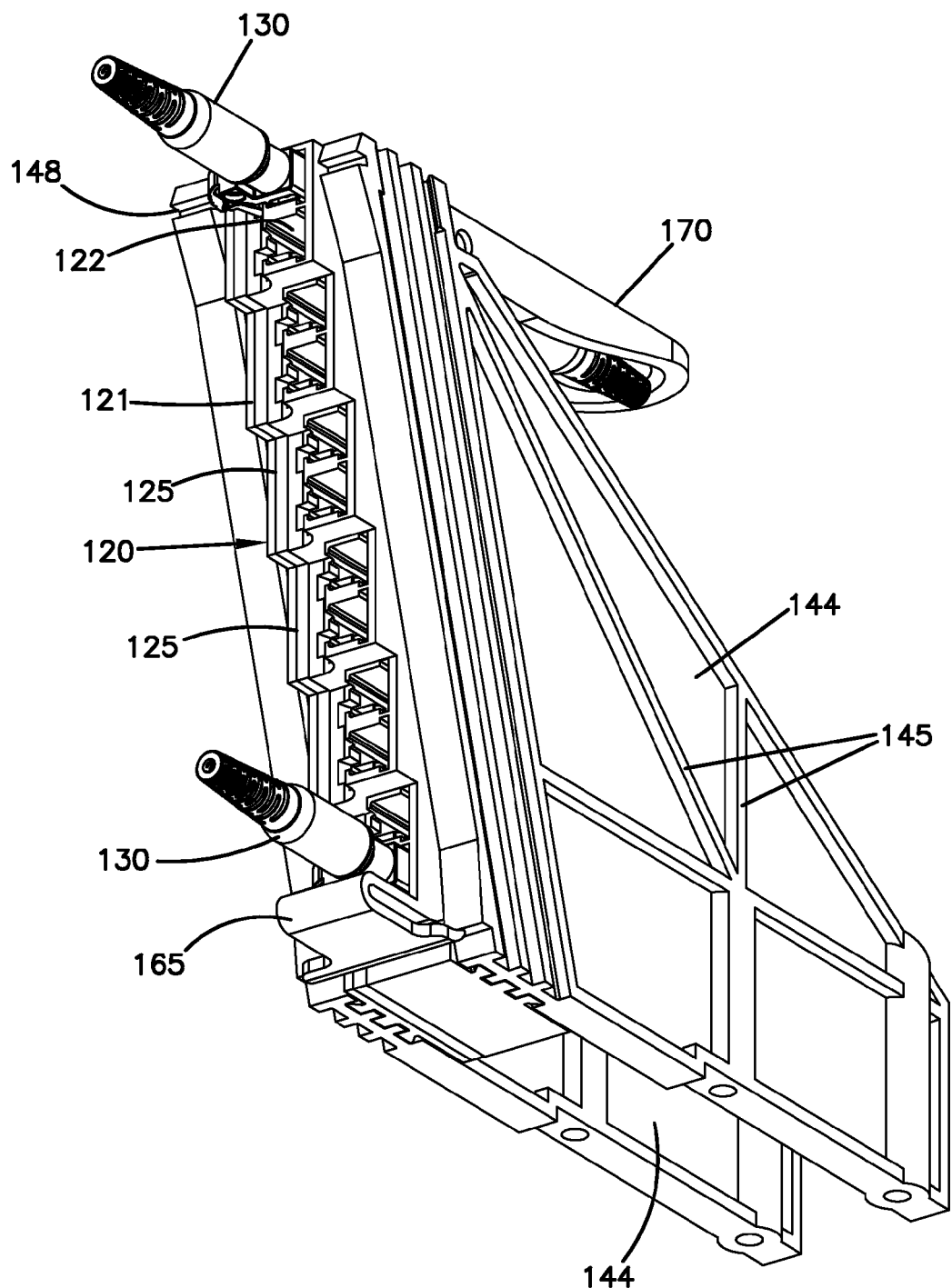
FIG. 4 is a front, bottom view of an example adapter module positioned in a non-extended position between two walls with a first fiber optic connector received at a top, front port, a second fiber optic connector received at a bottom, front port, and a third fiber optic connector received at a top, rear port of the adapter module.
Figure 5:
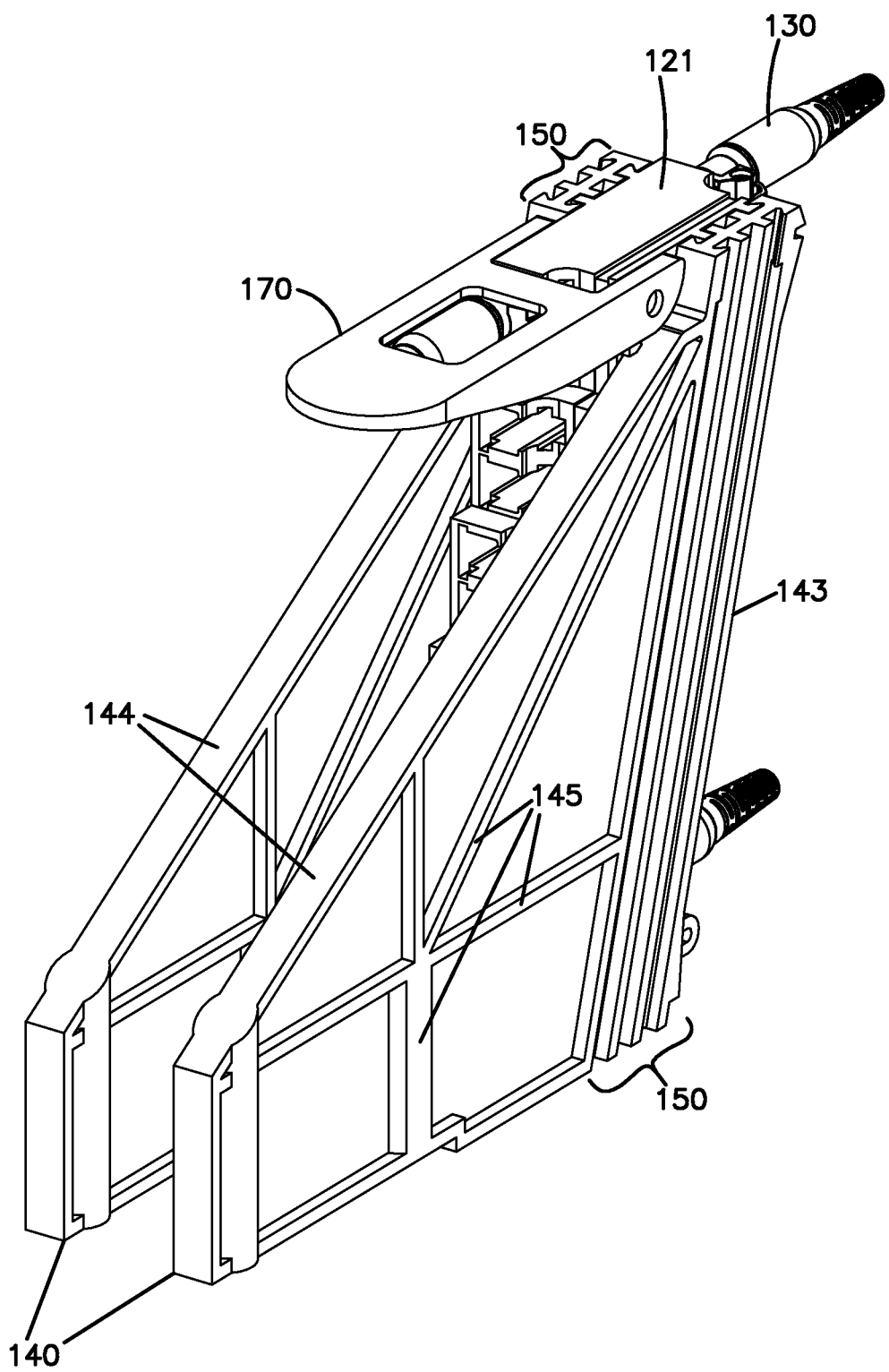
FIG. 5 is a rear, top view of the example adapter module and walls of FIG. 4.

The wall 140 also defines a plurality of linear grooves 150 on opposite sides 141, 142 of the guiding section 143 of the wall 140. In the example shown, the guiding section 143 includes a first groove 151, a second groove 152, and a third groove 153 of each side 141, 142 of the wall 140. The third groove 153 is positioned between the first and second grooves 151, 152. In other implementations, however, the guiding section 143 may include greater or fewer grooves 150. Each of the grooves 150 of one wall 140 is configured to cooperate with an opposing groove 150 from an adjacent wall 140 (see FIGS. 4 and 5) to provide a track for the sliding adapter module 120, as will be described in further detail below.

In some implementations, at least a portion of at least one of the grooves 150 is dovetailed. In the example shown, a top section 154 of the first groove 151 is dovetailed and a top section 155 of the second groove 152 is dovetailed. The remaining lengths of both grooves 151, 152 have generally rectangular transverse cross-sections. In other implementations, the grooves 151, 152 are dovetailed along their entire length. In certain implementations, the third groove 153 is dovetailed along a portion of its length. In the example shown, the third groove 153 is not dovetailed.

Referring now to FIGS. 18-25, one example implementation of a sliding adapter module 120 is illustrated. The adaptor module 120 includes a module housing 121 having a first side 129 and a second side 169 extending between a top 127 and a bottom 128. The module housing 121 defines a plurality of passages 122 extending between a first end and a second end of the module housing 121. The passages 122 are aligned parallel to each other in a column extending between the top 127 of the module housing 121 to the bottom 128 of the module housing 121

Figure 20:
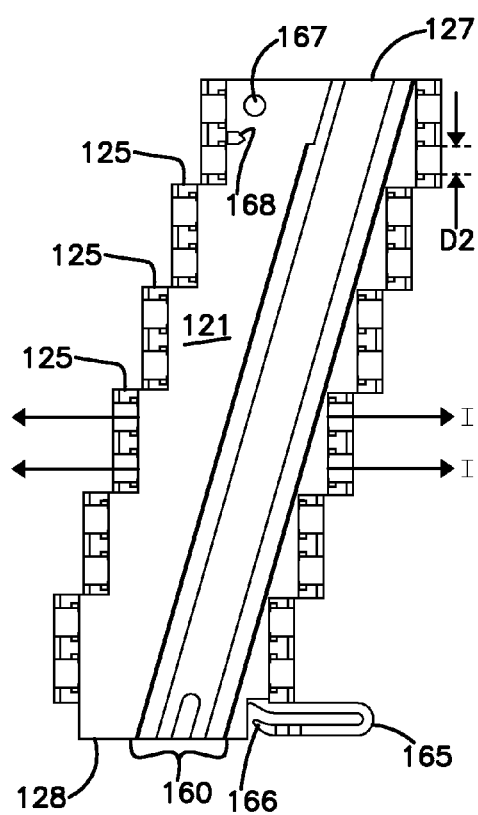
FIGS. 20 and 21 are side elevational views of the first example adapter module of FIG. 18.
Figure 21:
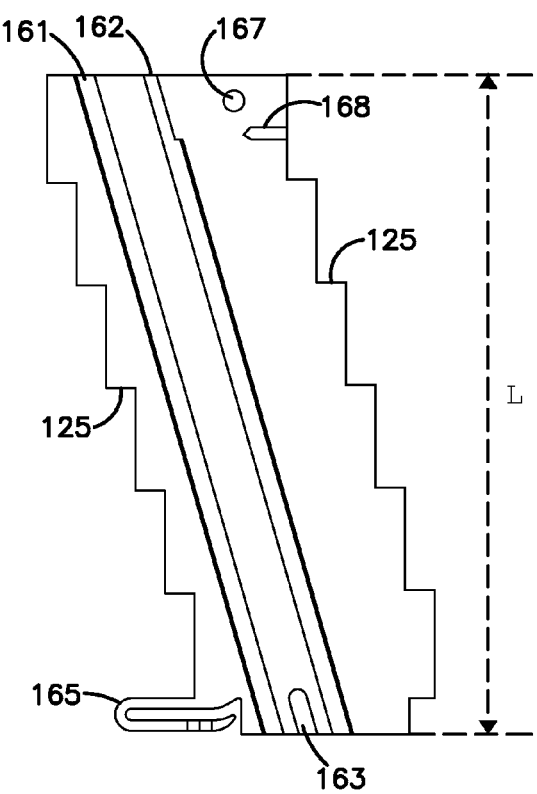
Figure 22:
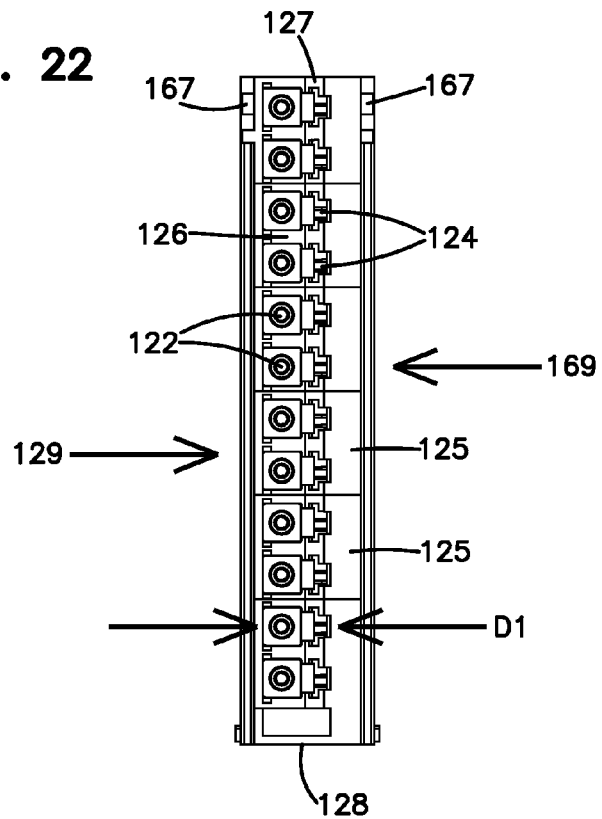
FIG. 22 is a rear elevational view of the first example adapter module of FIG. 18.
Figure 23:
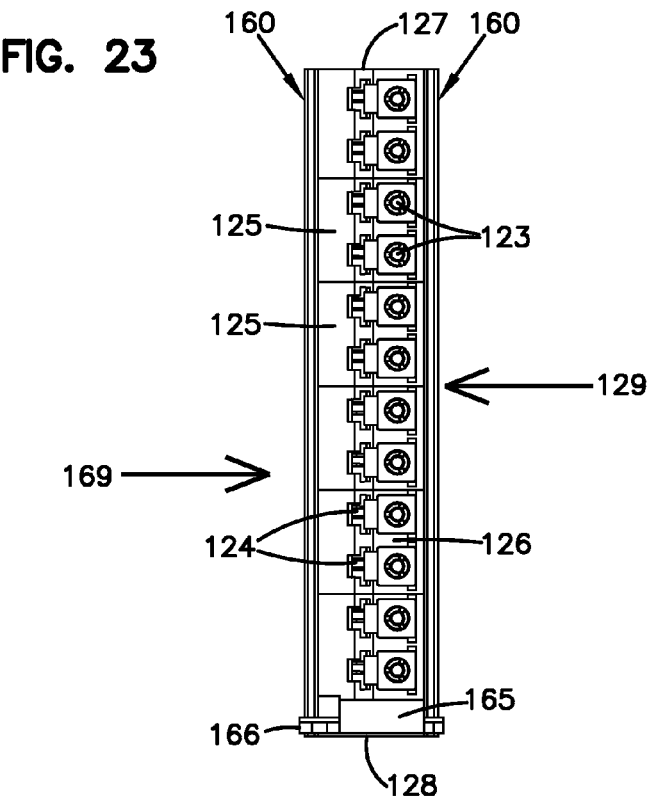
FIG. 23 is a front elevational view of the first example adapter module of FIG. 18.
Figure 24:
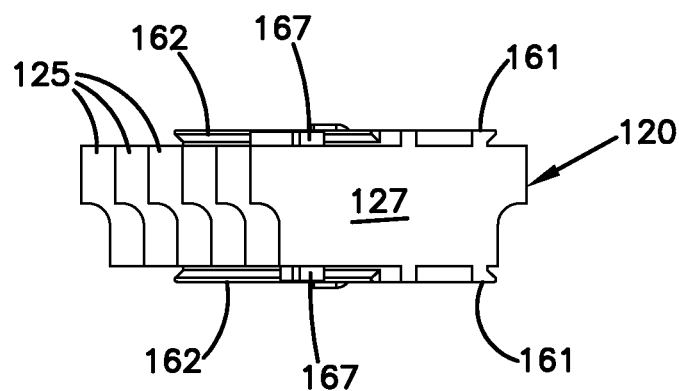
FIG. 24 is a top plan view of the first example adapter module of FIG. 18.
Figure 25:
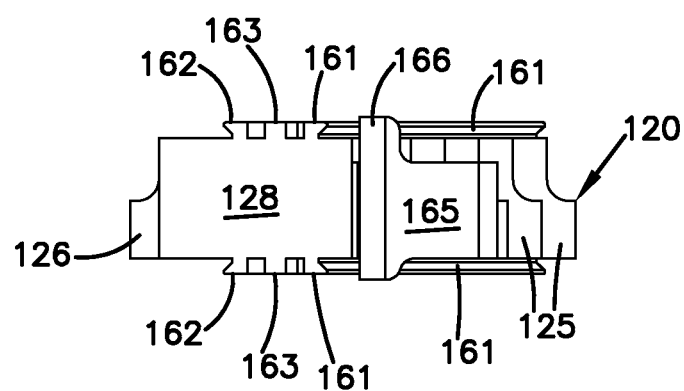
FIG. 25 is a bottom plan view of the first example adapter module of FIG. 18.
Figure 31:
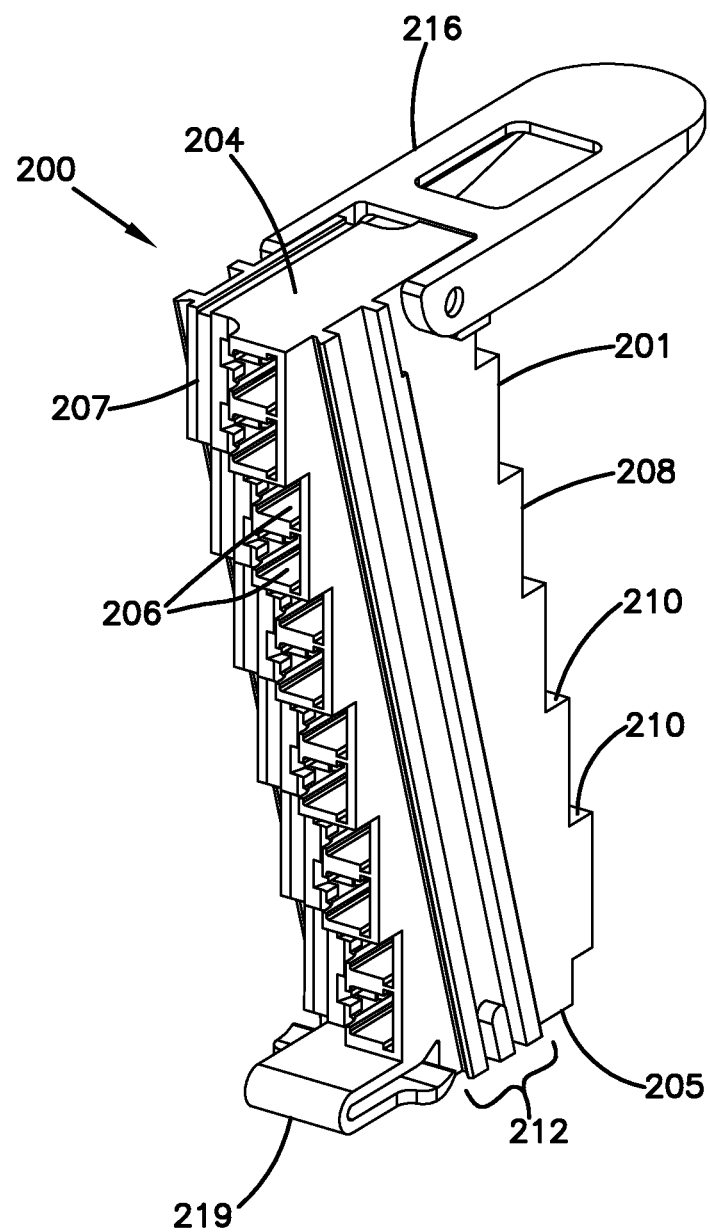
FIG. 31 is a top, front view of a second example adapter module configured in accordance with the principles of the present disclosure.
Figure 32:
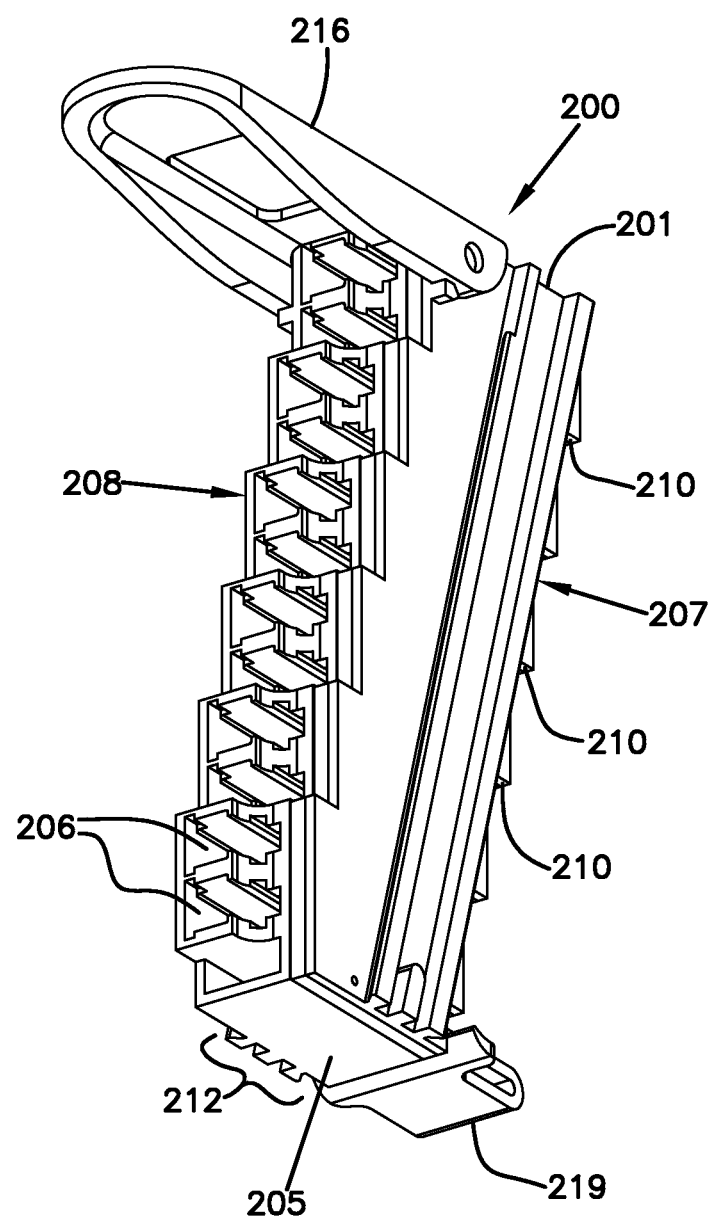
FIG. 32 is a bottom, rear view of the second example adapter module of FIG. 31.

Each end of each passage 122 forms an adapter port at which a fiber optic connector 130 may be received along an insertion axis I (FIG. 20). In some implementations, the adapter ports are configured to receive LC-type fiber optic connectors 130. In such implementations, a split sleeve 123 is located within each passage 122. In other implementations, the adapter ports are configured to receive other types of fiber optic connectors (e.g., SC-type connectors, FC-type connectors, ST-type connectors, etc.). In some such implementations, other ferrule alignment structures may be located within the passages 122).

In some implementations, the ends of the passage 122 define latching notches 124 at which a latching arm of an LC-type connector 130 may be received. In the example shown, the adapter ports are oriented so that the latching notches 124 face the second side 169 of the module housing 121. In certain implementations, the passages 122 are spaced closer to the first side 129 of the module housing 121 than the second side 169 (see FIGS. 22 and 23). For example, the passages 122 may be positioned relative to the first and second sides 129, 169 so that a sufficient gap remains between the latching notches 124 and the second side 169 to accommodate the latching arms of the connectors 130.

In some implementations, the adapter module housing 121 has a rectangular shape. In other implementations, the adapter module housing 121 has a stepped configuration with one or more passages 122 located at each step 125. For example, in certain implementations, the module housing 121 may define a series of steps 125 that are laterally offset from each other along the insertion axes of the ports. In the example shown, the adapter housing 121 defines six steps 125. In other implementations, the module housing 121 may define greater or fewer steps 125 (e.g., one, two, four, eight, etc.).

In some implementations, each step 125 of the module housing 121 defines a single passage 122. In other implementations, however, each step 125 of the module housing 121 defines a plurality of passages 122. A separator wall 126 extends between adjacent passages 122 of each step 125. In the example shown, each step 125 of the module housing 121 defines two passages 122. In other implementations, each step 125 may define greater or fewer passages 122 (e.g., one, three, four, etc.).

For slidability, the adapter module housing 121 defines a plurality of cooperating guide rails 160 for slidably mating with the grooves 150 define in the wall 140. The guide rails 160 include first and second guide rails 161, 162, respectively, which extend generally parallel to each other between the top 167 and bottom 168 of the module housing 121. The guide rails 160 also include a guide extension 163 adjacent the bottom 168 of the housing 121. In the example shown, the guide rails 160 extend diagonally along the first and second sides 129, 169 of the module housing 121.

When in the extended position, the module housing 121 is secured to the walls 140 over a relatively small surface area at the bottom of the guide rails 160 and the top of the wall grooves 150. The two guide rails 161, 162 cooperate to secure the module housing 121 to the walls 140 even when the module housing 121 is in the extended position. For example, having two guide rails 161, 162 instead of a single guide rail provides increased surface area contact between the module housing 121 and the wall grooves 150, which may facilitate maintaining retaining the module housing 121 between the walls 140. The guide extension 163 also provides increased contact with the walls 140 when the module housing 121 is in the extended position.

In some implementations, the first and second guide rails 161, 162 are dovetailed along at least a portion of their lengths to facilitate maintaining the guide rails 160 within the wall grooves 150. In certain implementations, one or both of the first and second guide rails 161, 162 are dovetailed along their entire length. In the example shown, the first guide rail 161 is dovetailed along its entire length; the second guide rail 162 is dovetailed along a majority of its length and has a generally rectangular transverse cross-section for the rest of its length. In one implementation, the guide extension 163 is dovetailed. In another implementation, the guide extension has a rectangular transverse cross-section. In one implementation, both ends of the guide extension 163 are squared-off. In other implementations, the top end of the guide extension 163 is rounded, tapered, or otherwise contoured.

The top 127 of the module housing 121 is configured to receive a handle 170. For example, in certain implementations, a rotation pin 167 and a stop edge 168 are located on either side 129, 169 at the top 127 of the module housing 121. The bottom 128 of the module housing 121 defines a locking tab 165. The handle 170 and the locking tab 165 cooperate to releasably secure the module housing 121 in the non-extended position when mounted to the walls 140. The locking tab 165 also may aid in securing the module housing 121 in the extended position as will be described in more detail herein.

In some implementations, the locking tab 165 is located below the bottom-most passage 122 of the adapter module 121. In certain implementations, the locking tab 165 is monolithically formed with the adapter module 121. The locking tab 165 includes a latching edge 166 at an end of a spring portion. In the example shown, the locking tab 165 defines a spring portion that extends outwardly from the housing along the insertion axis I of the ports and folds or loops back towards the adapter housing 121. The latching edge 166 extends outwardly from the spring portion towards the first and second sides 129, 169 of the module housing 121.

In some implementations, the module housing 121 and the integral locking tab 165 are molded out of materials that are flexible and sufficiently strong to allow for repeated elastic rotation. In certain embodiments, the module housing 121 and locking tab 165 may be made from VALOX® PBT Resin.

One example handle 170 is shown in FIGS. 26-30. The handle 170 includes two arms 171 that each define a pin opening 172. The pin opening 172 of each arm 171 is sized and shaped to fit over the rotation pin 167 at one side 129, 169 of the module housing 121. Each arm 171 of the handle 170 defines an abutment surface 175 that is configured to interact with a respective wall 140 to release the module housing 121 from the non-extended position as will be described in more detail herein.

A grip surface 173 extends between the two arms 171. The grip surface 173 facilitates moving the module housing 121 between the non-extended and extended positions. In the example shown, the grip surface 173 defines an opening 174. In certain implementations, the opening 174 is sized to enable a finger of a user to be inserted into the opening to provide a better grip on the handle 170. In other implementations, the opening 174 is sized and shaped to provide clearance for the connectors. In still other implementations, the grip surface 173 may be solid. In the example shown, the grip surface 173 defines a rounded end opposite the arms 171. In other implementations, the end of the grip surface 173 may be squared or otherwise contoured.

The handle 170 pivots between a first position (see FIG. 6), in which the grip surface 173 extends generally parallel to the insertion axes I of the adapter ports, and a second position (see FIG. 2), in which the grip surface extends generally parallel to the guide rails 160 of the module housing 121. In some implementations, the arms 171 of the handle 170 rest on stop edges 168 of the module housing 121 when the handle 170 is in the first position to inhibit further movement of the handle 170 beyond the first position. The abutment surface 175 of the handle engages the stop edge 168 when the handle 170 is in the second position to inhibit further movement of the handle 170 beyond the second position.

Figure 57:
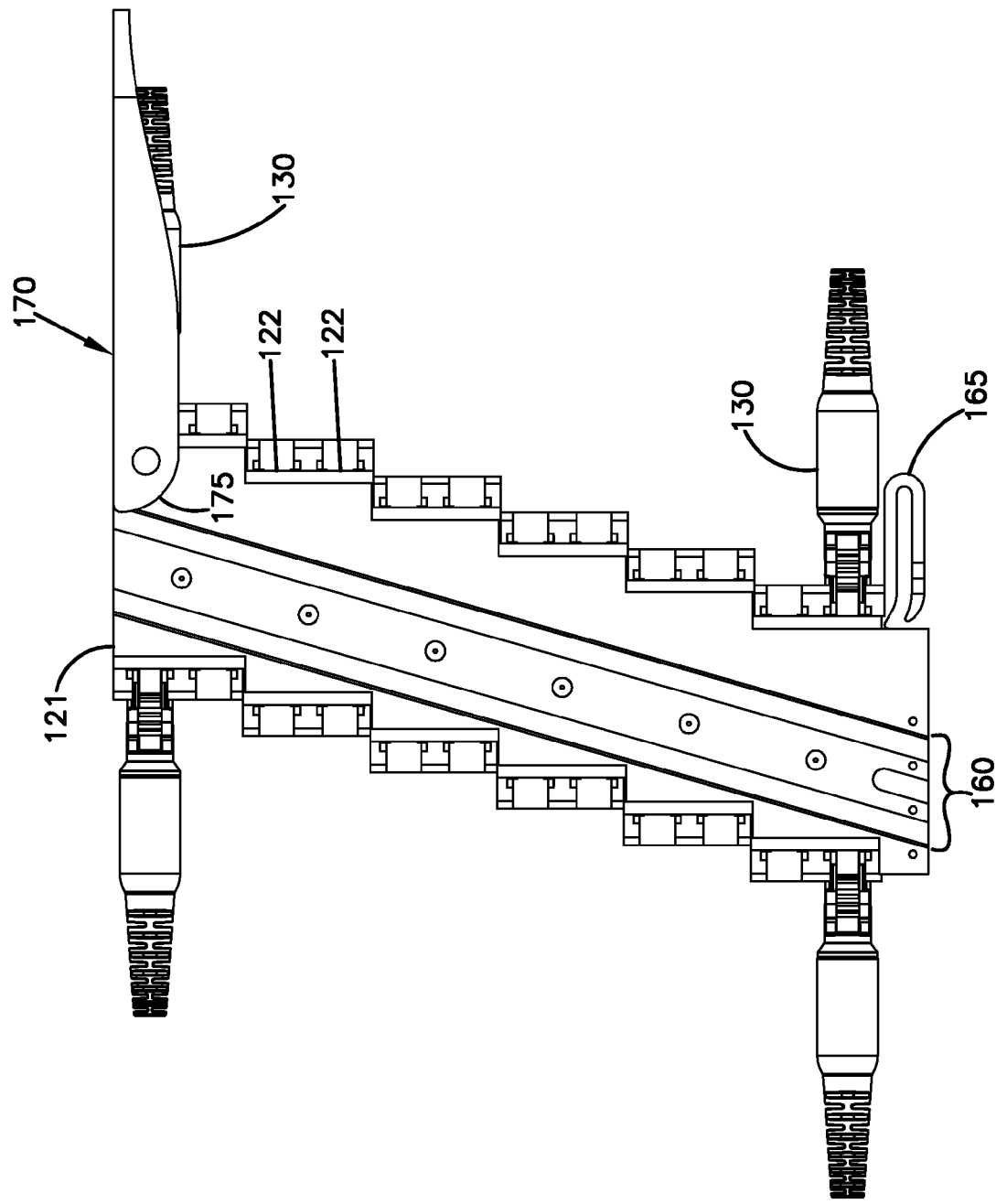
FIG. 57 is a side elevational view of a third example adapter module having a handle located at a same side of the adapter module as a locking tab in accordance with aspects of the disclosure.

In some implementations, the handle 170 is located on an opposite side of the guide rails 160 from the locking tab 165. In some such implementations, the abutment surfaces 175 of the handle 170 are configured to engage the shoulders 149 of the housings 140 that are defined above the support section 144. In other implementations, the handle 170 is located on the same side of the guide rails 160 as the locking tab 165 (see FIG. 57). In some such implementations, the abutment surfaces 175 of the handle 170 engage notches defines in the walls 140 opposite the support section 144.

A module housing 121 is installed by positioning the adapter module 120 at the walls 140 so that the locking tab 165 faces away from the support structure 144 and the guide rails 160 at the bottom 128 of the module housing 121 align with the grooves 150 at the top of two adjacent walls 140 (see FIG. 2). The first guide rail 161 is aligned with the first wall groove 151, the second guide rail 162 is aligned with the second wall groove 152, and the guide extension 163 is aligned with the third wall groove 153. The dovetailed sections of the guide rails 161, 162 fit into the dovetailed sections 154, 155 of the wall grooves 151, 152, respectively, and the module housing 121 is slid at least partially downwardly along the wall grooves 150. When the module housing 121 reaches the bottom of the walls 140, the latching edge 166 of the locking tab 165 cams over the ramp 146 of each wall 140 and snaps behind the shoulder 147 of each wall 140 to releasably lock the adapter module 120 in the non-extended position. The handle 170 is rotated to the first position (see FIG. 4).

To move the adapter module 120 to the extended position, a user rotates the handle 170 to the second position. Rotating the handle 170 causes the abutment surface 175 of the handle 170 to press against the shoulder 149 defined on each wall 140, thereby applying sufficient force to the adapter module 120 to release the latching edge 166 of the locking tab 165 from the shoulders 147 of the opposing walls 140. For example, the force may move the module housing 121 forward, thereby lifting the latching edge 166 out from behind the shoulders 147 (e.g., by elastically flexing the spring portion of the locking tab 165). When the latching edge 166 is released, the module housing 121 may be freely moved along the wall grooves 150. When the module housing 121 reaches the top of the walls 140, the latching edge 166 of the locking tab 165 snaps into the notched tab 148 of each of the opposing walls 140 to releasably lock the adapter module 120 in the extended position relative to the walls 140. As such, when the adapter module 120 is in the fully extended position (see FIGS. 2 and 3), the module housing 121 is inhibited from sliding off the walls 140.

If desired (e.g., for repair or replacement of the adapter module 120), at the fully extended position, the adapter module 120 may be fully removed from the walls 140. In some implementations, the module housing 121 is removed from the walls 140 by applying sufficient force to the module housing 121 to snap the latching edge 166 of the locking tab 165 out of the notched tab 148. In other implementations, the module housing 120 is removed from the walls 140 by squeezing or pressing on the spring portion of the locking tab 165 to flex the latching edge 166 out of the notched tab 148 of each wall 140.

The adapter module 120, by being manufactured from a single-piece housing 121 defining an integral block of adapters, can have reduced overall length, width, and height as compared the same number of separate adapters positioned adjacent each other, thereby allowing for higher density of fiber terminations. For example, each adapter opening 122 includes a major dimension D1 (FIG. 22) and a minor dimension D2 (FIG. 20) wherein the major dimension D1 is greater than the minor dimension D2 (see FIG. 23). The module housing 121 is configured such that openings 122 are lined up along their minor dimensions D2 forming a length L (FIG. 21) for the entire array of adapters (see FIG. 23).

The major dimension D1 is sized to generally correspond to the key area of an LC-type connector 130 and the minor dimension D2 is sized to generally correspond to the shorter sides of the LC-type connector 130, which are commonly known in the art. By aligning the minor dimensions D2 of the adapter ports to form the array of adapters, the overall length L of the array of adapters can be reduced relative to separately mounted adapters. In some implementations, the overall length L may range from about 3 inches to about 3.3 inches. In one example implementation, the overall length L is about 3.16 inches and each step is about 0.5 inches long. In other implementations, however, the adapter module 120 may be longer or shorter.

Figure 36:
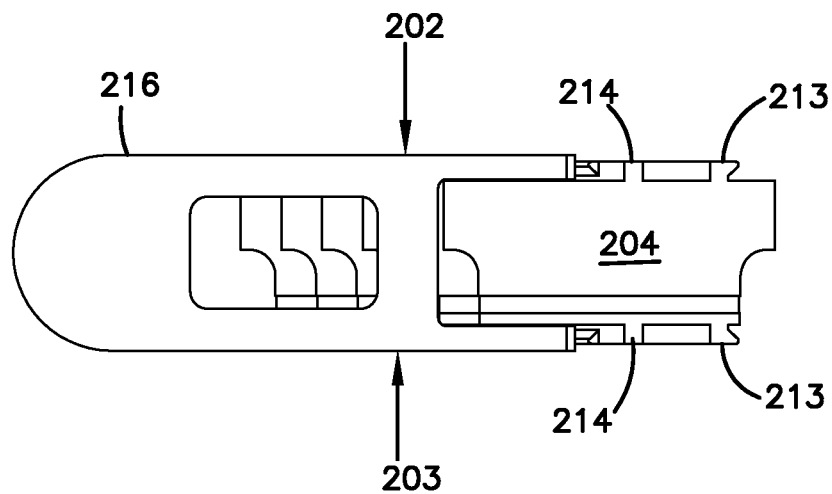
FIG. 36 is a top plan view of the first example adapter module of FIG. 31.
Figure 37:
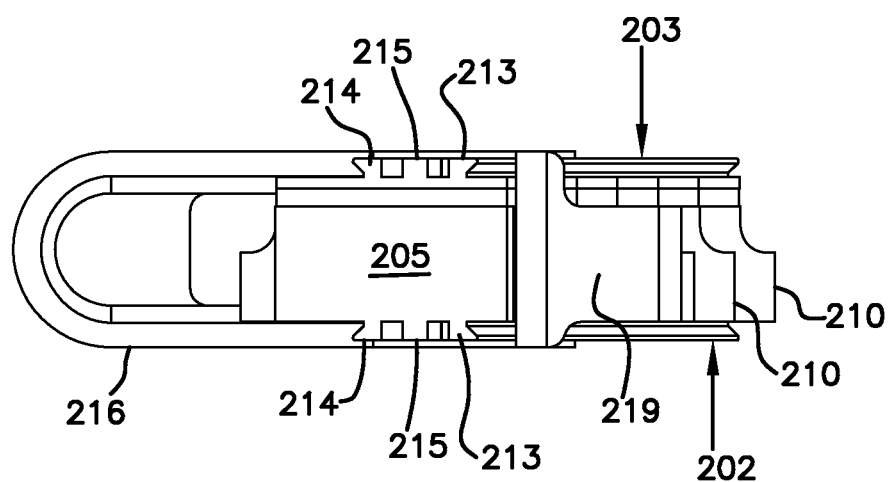
FIG. 37 is a bottom plan view of the first example adapter module of FIG. 31.
Figure 38:
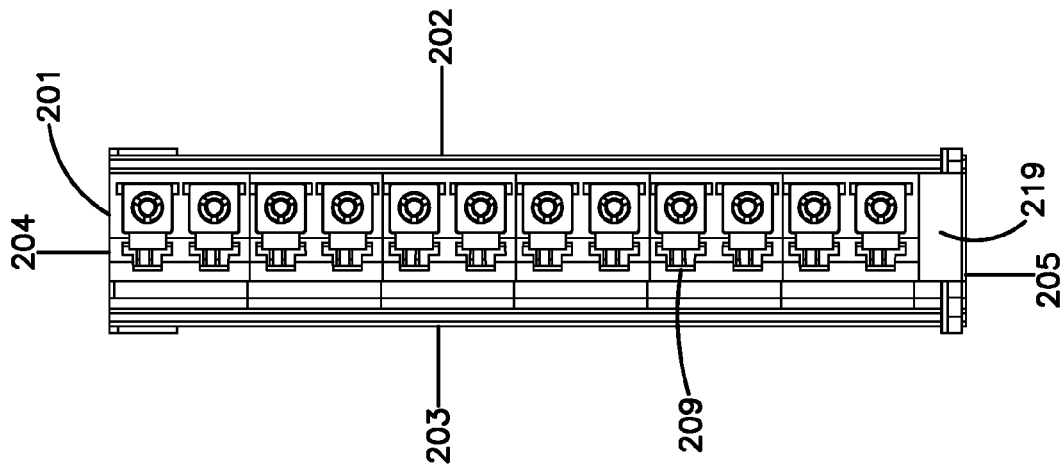
FIG. 38 is a rear elevational view of the first example adapter module of FIG. 31.
Figure 39:
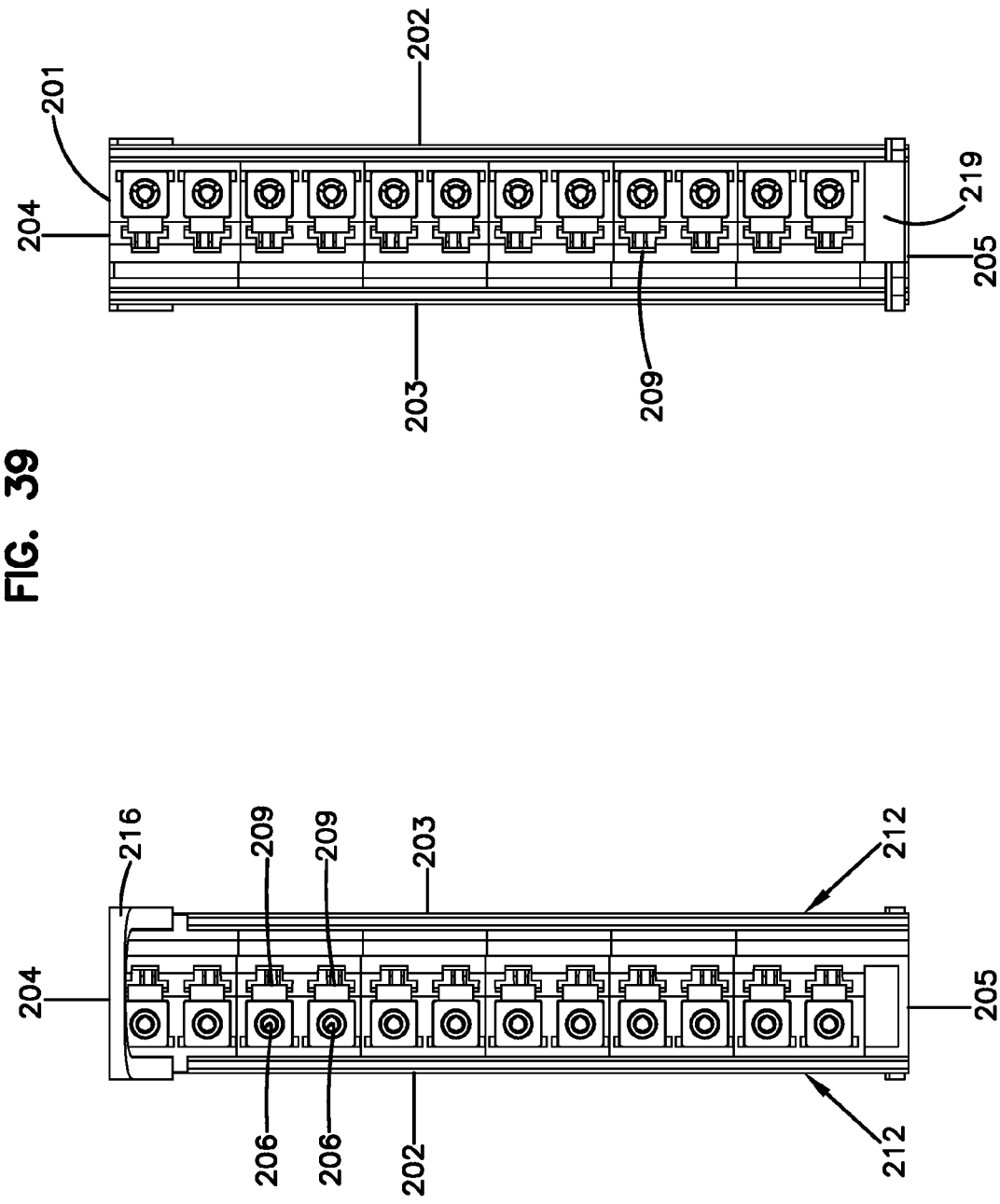
FIG. 39 is a front elevational view of the first example adapter module of FIG. 31.
Figure 41:
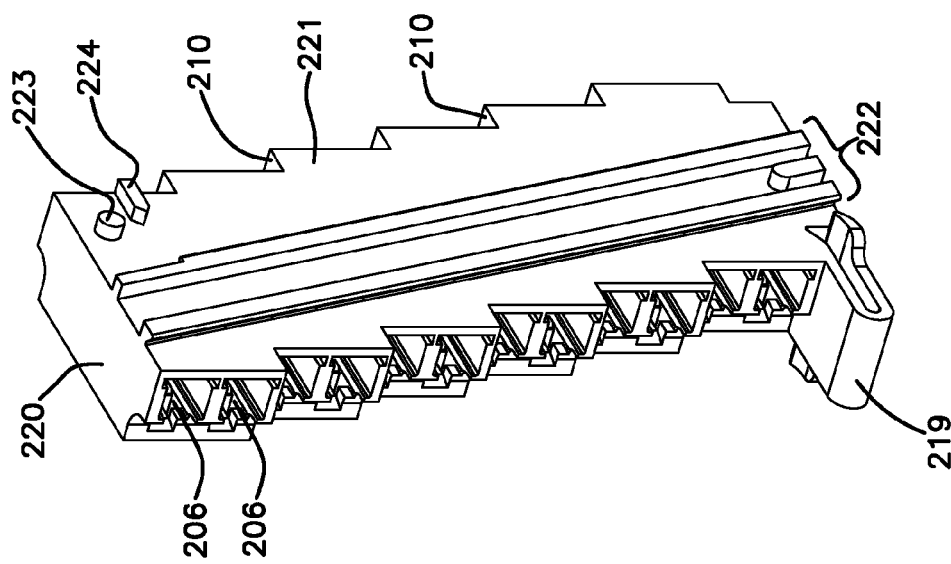
FIGS. 40-47 show one example termination block suitable for use with the second example adapter module of FIG. 31.
Figure 40:
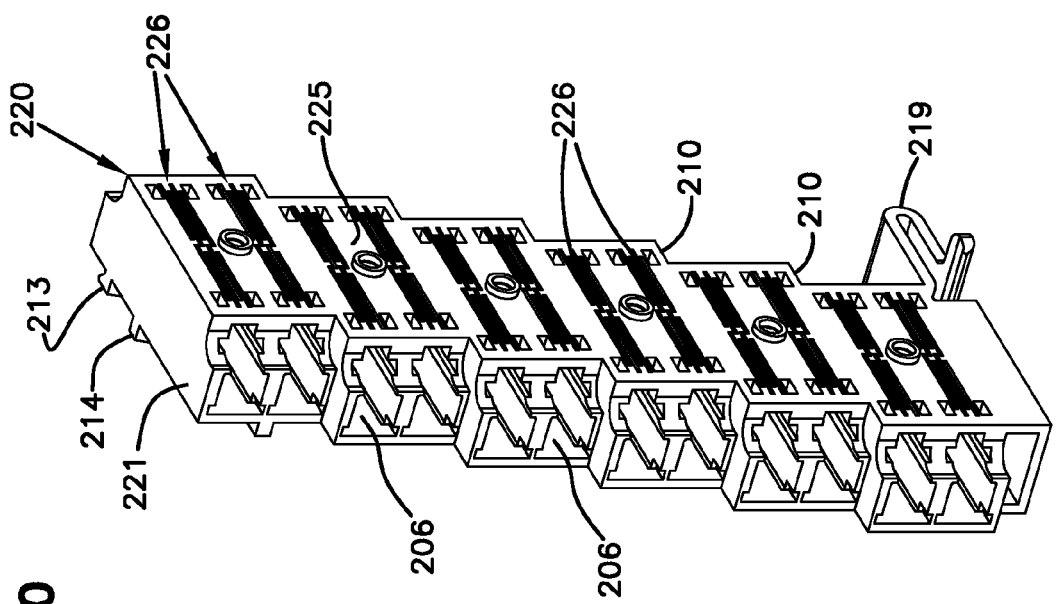
Figure 43:
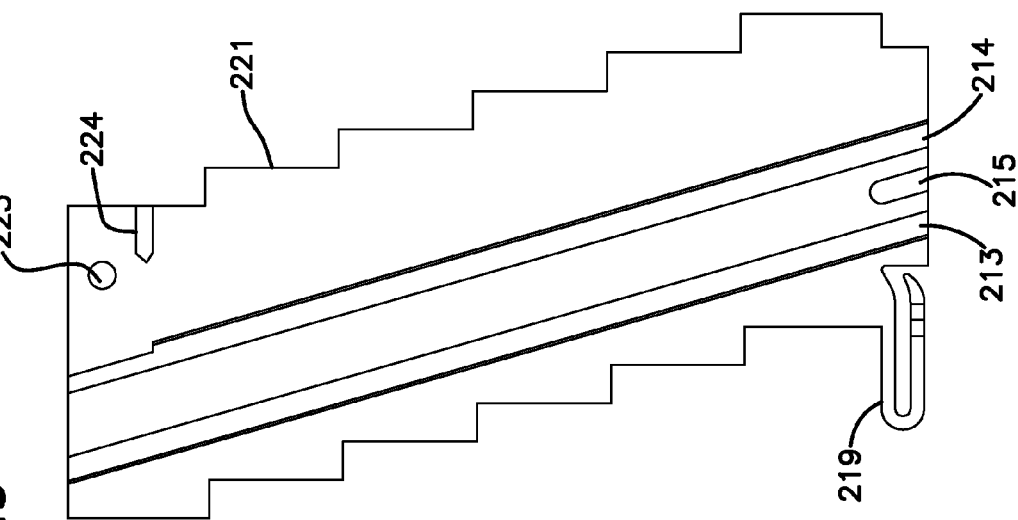
Figure 42:
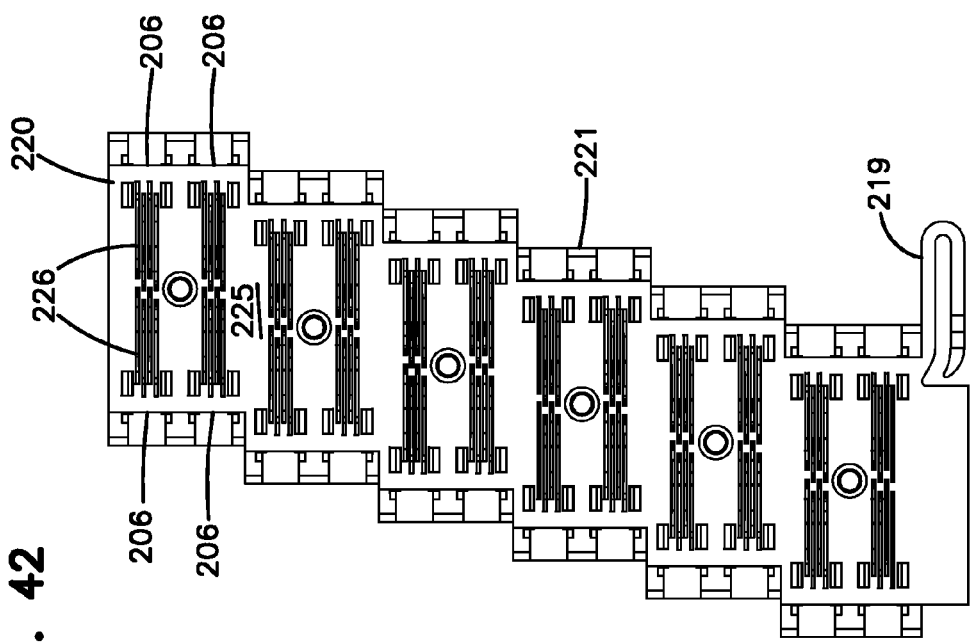
Figure 44:
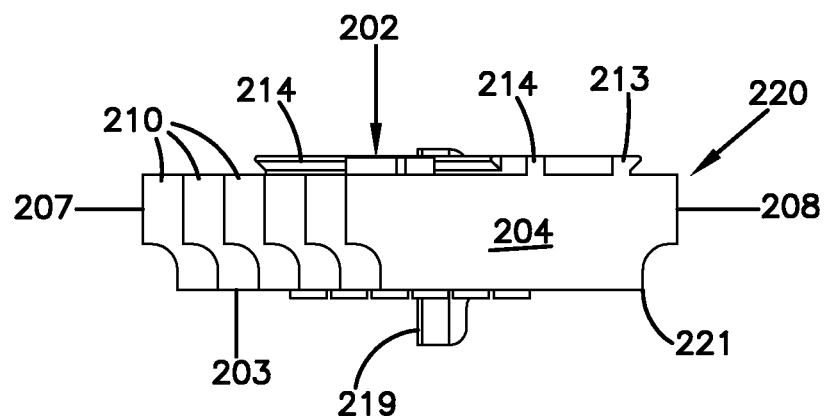
Figure 45:
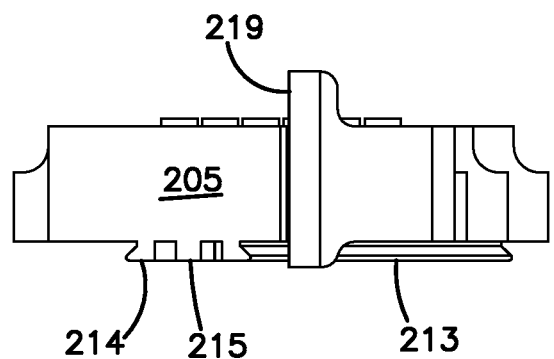
Figure 46:
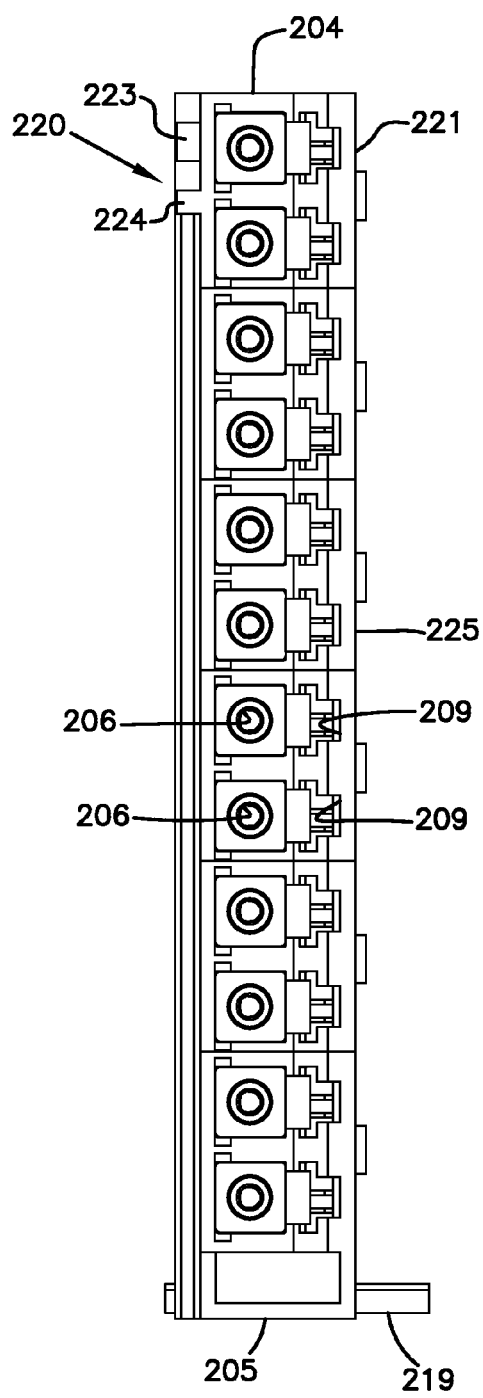
Figure 47:
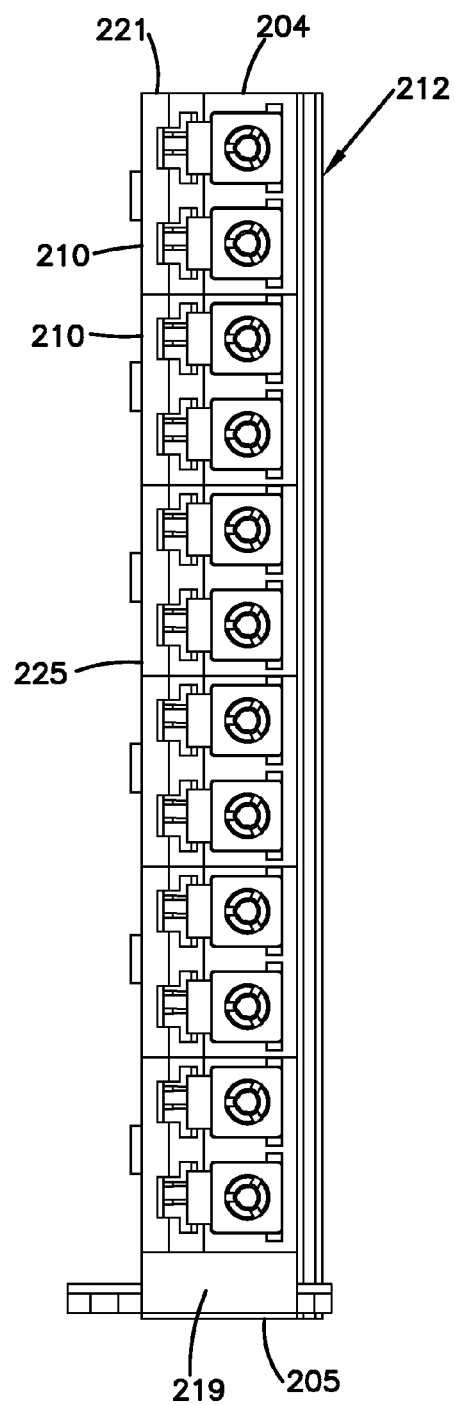
Figure 48:
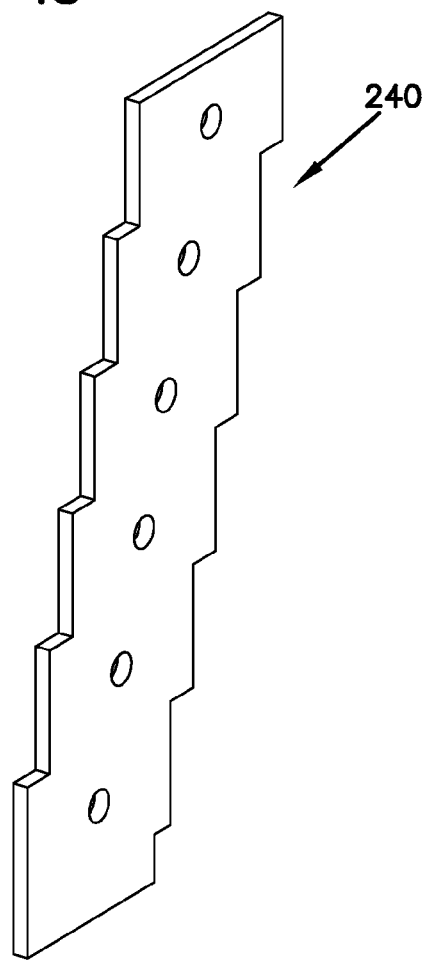
FIGS. 48 and 49 show one example circuit board suitable for use with the second example adapter module of FIG. 31.
Figure 49:
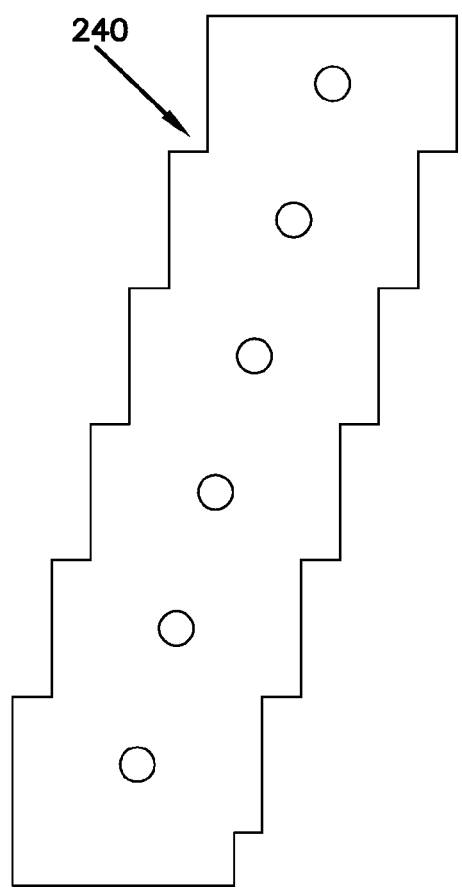
Figure 51:
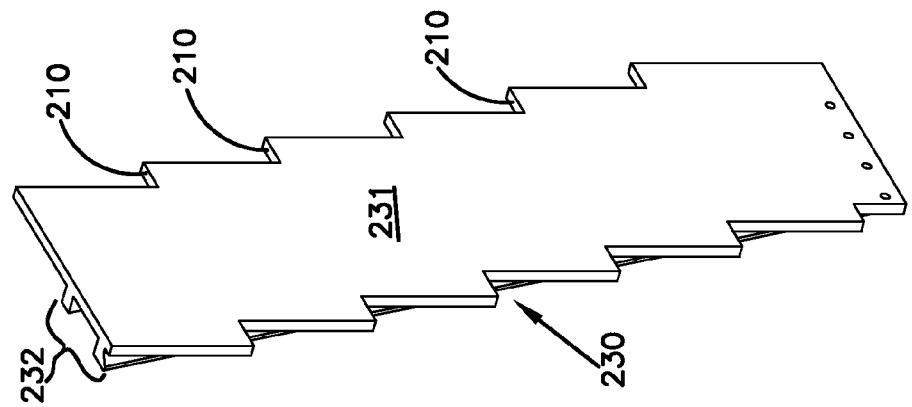
FIGS. 50-55 show one example cover suitable for use with the second example adapter module of FIG. 31.
Figure 50:
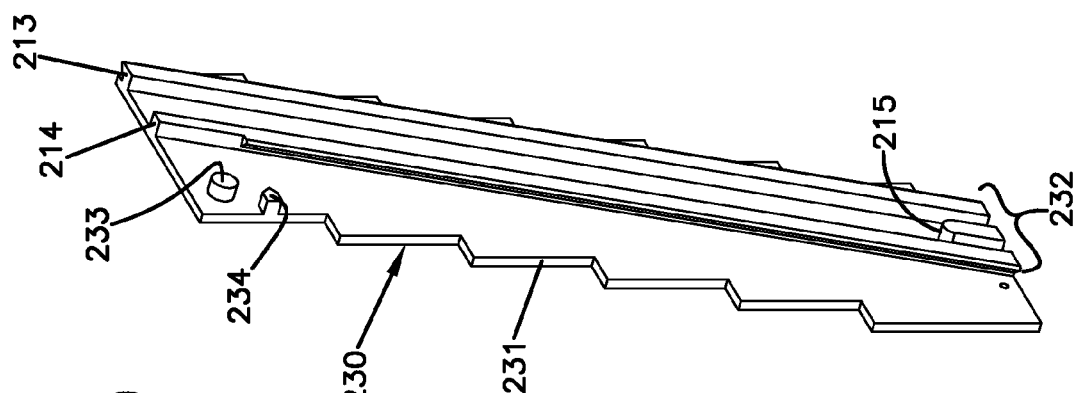
Figure 53:
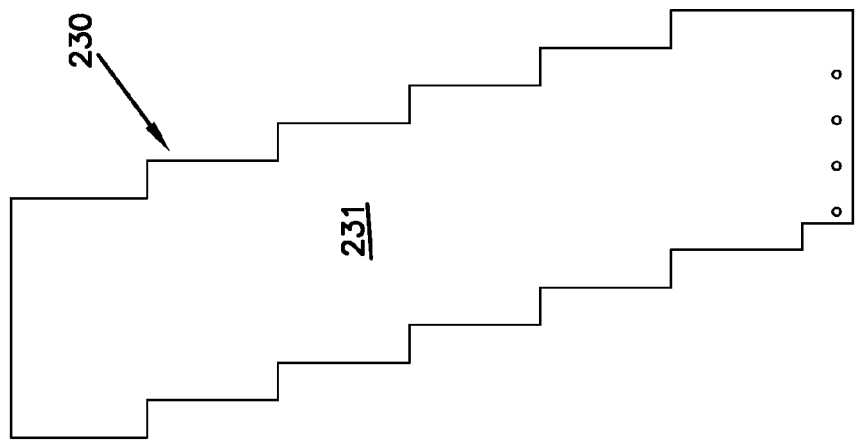
Figure 52:
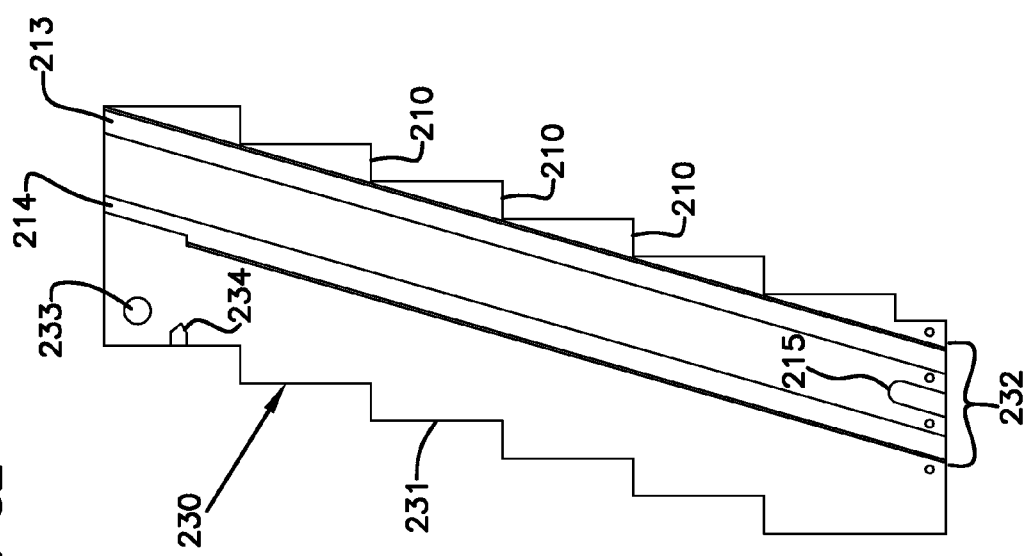
Figure 54:
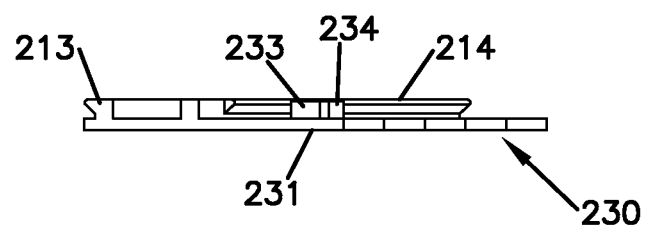
Figure 55:
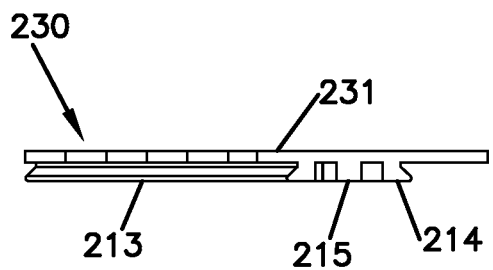

In some implementations, the overall width W of the adapter module 120 including the handle 170 (see FIG. 36) may range from about 0.5 inches to about 1 inch. In certain implementations, the overall width W ranges between about 0.6 inches and about 0.8 inches. In one example implementation, the overall width W is about 0.68 inches. In one example implementation, a center-to-center spacing of the adapter modules 120 is about 0.7 inches. In other implementations, however, the adapter module 120 may be wider or narrower.

FIGS. 31-56 show another example implementation of an adapter module 200 that is configured to slide along the walls 140 between a non-extended position and an extended position to provide selective access to fiber optic connectors 130 mounted thereat. The adapter modules 200 slides in a direction generally non-parallel to the longitudinal axes A of the connectors 130 mounted on the modules 200.

The adaptor module 200 includes a module housing 201 having a first side 202 and a second side 203 extending between a top 204 and a bottom 205. The module housing 201 defines a plurality of passages 206 extending between a first end 207 and a second end 208 of the module housing 201. The passages 206 are aligned parallel to each other in a column extending between the top 204 and bottom 205 of the module housing 201

Each end of each passage 206 forms an adapter port at which a fiber optic connector 130 may be received along an insertion axis I' (FIG. 20). In some implementations, the adapter ports are configured to receive LC-type fiber optic connectors 130. In such implementations, a split sleeve is located within each passage 206. In other implementations, the adapter ports are configured to receive other types of fiber optic connectors (e.g., SC-type connectors, FC-type connectors, ST-type connectors, etc.). In some such implementations, other ferrule alignment structures may be located within the passages 206).

In some implementations, the ends of the passage 206 define latching notches 209 at which a latching arm of an LC-type connector 130 may be received. In the example shown, the adapter ports are oriented so that the latching notches 209 face the second side 203 of the module housing 201. In certain implementations, the passages 206 are spaced closer to the first side 202 of the module housing 201 than to the second side 203 (see FIGS. 38 and 39). For example, the passages 206 may be positioned relative to the first and second sides 202, 203 so that a sufficient gap remains between the latching notches 209 and the second side 203 to accommodate the latching arms of the connectors 130.

In some implementations, the adapter module housing 201 has a rectangular shape. In other implementations, the adapter module housing 201 has a stepped configuration with one or more passages 206 located at each step 210. For example, in certain implementations, the module housing 201 may define a series of steps 210 that are laterally offset from each other along the insertion axes I' of the ports. In the example shown, the adapter housing 201 defines six steps 210. In other implementations, the module housing 201 may define greater or fewer steps 210 (e.g., one, two, four, eight, etc.).

In some implementations, each step 210 of the module housing 201 defines a single passage 206. In other implementations, however, each step 210 of the module housing 201 defines a plurality of passages 206. A separator wall 211 extends between adjacent passages 206 of each step 210. In the example shown, each step 211 of the module housing 201 defines two passages 206. In other implementations, each step 210 may define greater or fewer passages 206 (e.g., one, three, four, etc.).

For slidability, the adapter module housing 201 defines a plurality of cooperating guide rails 212 for slidably mating with the grooves 150 define in the wall 140. The guide rails 212 include first and second guide rails 213, 214, respectively, which extend generally parallel to each other between the top 204 and bottom 205 of the module housing 201. The guide rails 212 also include a guide extension 215 adjacent the bottom 205 of the housing 201. In the example shown, the guide rails 212 extend diagonally along the first and second sides 202, 203 of the module housing 201.

In some implementations, the first and second guide rails 213, 214 are dovetailed along at least a portion of their lengths to facilitate maintaining the guide rails 212 within the wall grooves 150. In certain implementations, one or both of the first and second guide rails 213, 214 are dovetailed along their entire length. In the example shown, the first guide rail 213 is dovetailed along its entire length; the second guide rail 214 is dovetailed along a majority of its length and has a generally rectangular transverse cross-section for the rest of its length. In one implementation, the guide extension 215 is dovetailed. In another implementation, the guide extension has a rectangular transverse cross-section. In one implementation, both ends of the guide extension 215 are squared-off. In other implementations, the top end of the guide extension 215 is rounded, tapered, or otherwise contoured.

The top 204 of the module housing 201 is configured to receive a handle 216. For example, in certain implementations, a rotation pin 217 and a stop edge 218 are located on either side 202, 203 at the top 204 of the module housing 201. In some implementations, the rotation pin 217 and stop edge 218 are configured to receive the handle 170 described herein. In other implementations, another type of handle may be utilized. The bottom 205 of the module housing 201 defines a locking tab 219. In some implementations, the locking tab 219 is the same as locking tab 165 of the module housing 121 described herein. In other implementations, a different type of locking tab may be utilized.

The handle 216 and the locking tab 219 cooperate to releasably secure the module housing 201 in the non-extended position when mounted to the walls 140 (e.g., in the same way that the handle 170 and the locking tab 165 secure the module housing 121 in the non-extended position). The locking tab 219 also may aid in securing the module housing 201 in the extended position (e.g., in the same way that the locking tab 165 secured the module housing 121 in the extended position). In the example shown, the handle 216 is located at an opposite side of the guide rails 212 from the locking tab 219. In other implementations, however, the handle 216 may be located on the same side of the guide rails 212 as the locking tab 219.

In some implementations, the locking tab 219 is monolithically formed with at least part of the module housing 201. In some such implementations, the locking tab 219 is molded out of materials that are flexible and sufficiently strong to allow for repeated elastic rotation. In certain embodiments, the locking tab 219 may be made from VALOX® PBT Resin.

In accordance with some aspects, certain types of adapter modules 200 may be configured to collect physical layer information from one or more fiber optic connectors 130 received thereat. For example, certain types of adapter modules 200 may include media reading interfaces that are configured to engage memory contacts on the fiber optic connectors 130. Example fiber optic connectors having suitable memory storage and memory contacts are shown in U.S. application Ser. No. 13/025,841, filed Feb. 11, 2011, titled "Managed Fiber Connectivity Systems," the disclosure of which is hereby incorporated herein by reference.

Figure 33:
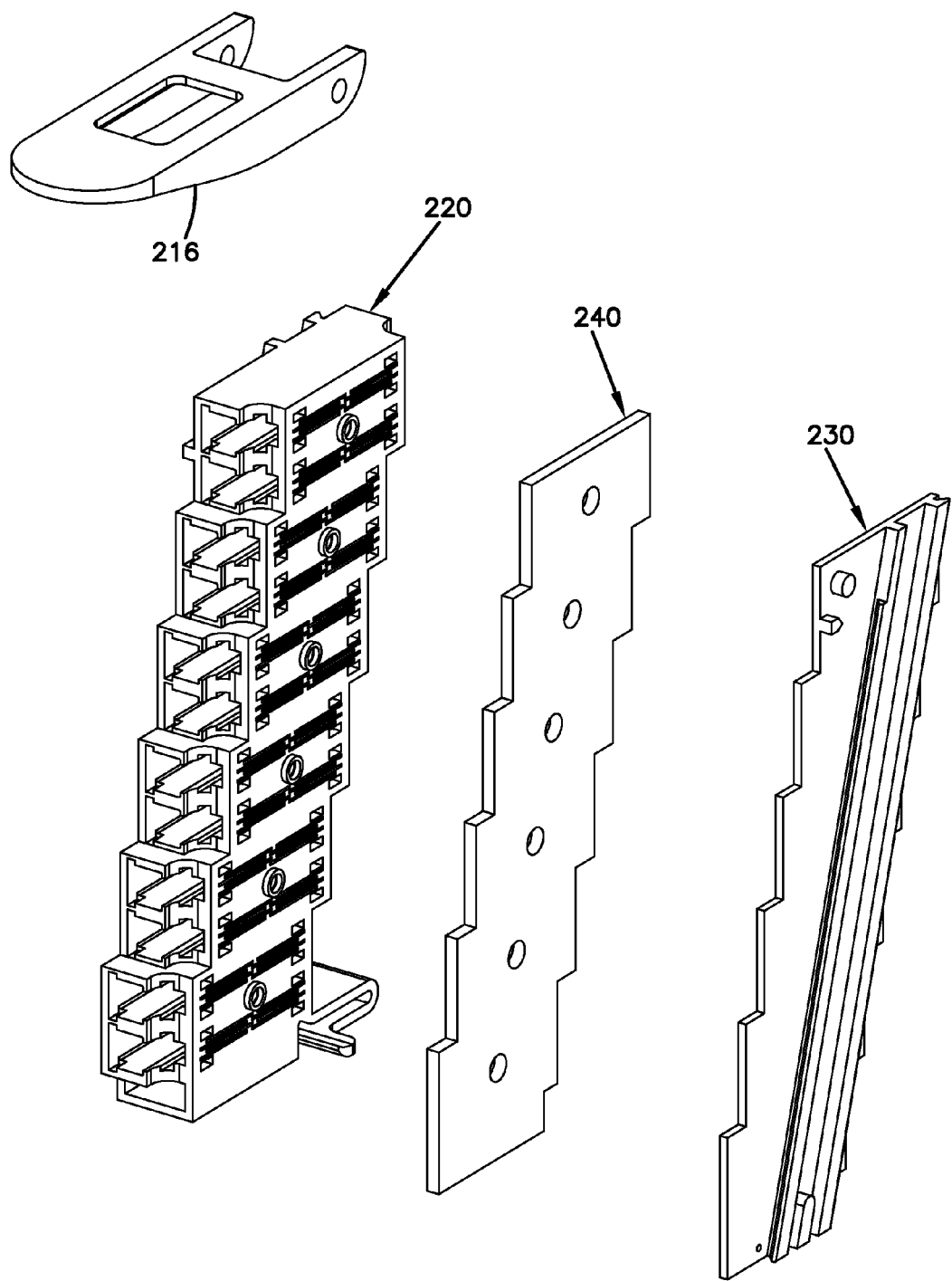
FIG. 33 is an exploded view of the second example adapter module of FIG. 31 including a termination block, a handle, a circuit board, and a cover in accordance with the principles of the present disclosure.
Figure 35:
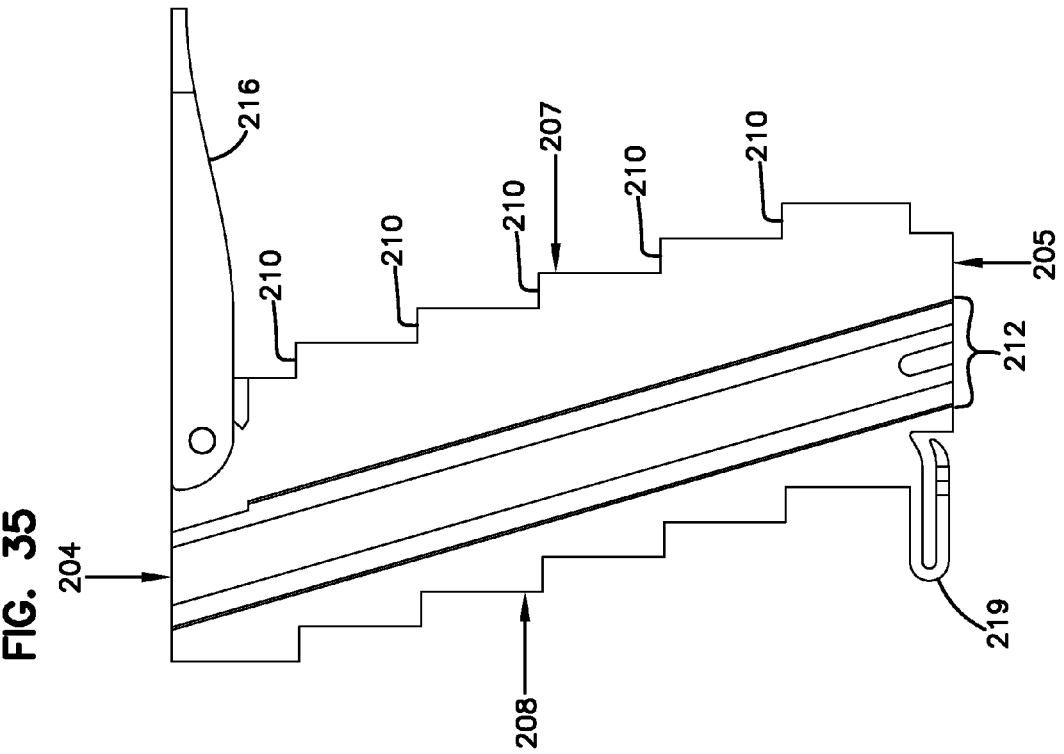
FIG. 35 is a second side elevational view of the first example adapter module of FIG. 31.
Figure 34:
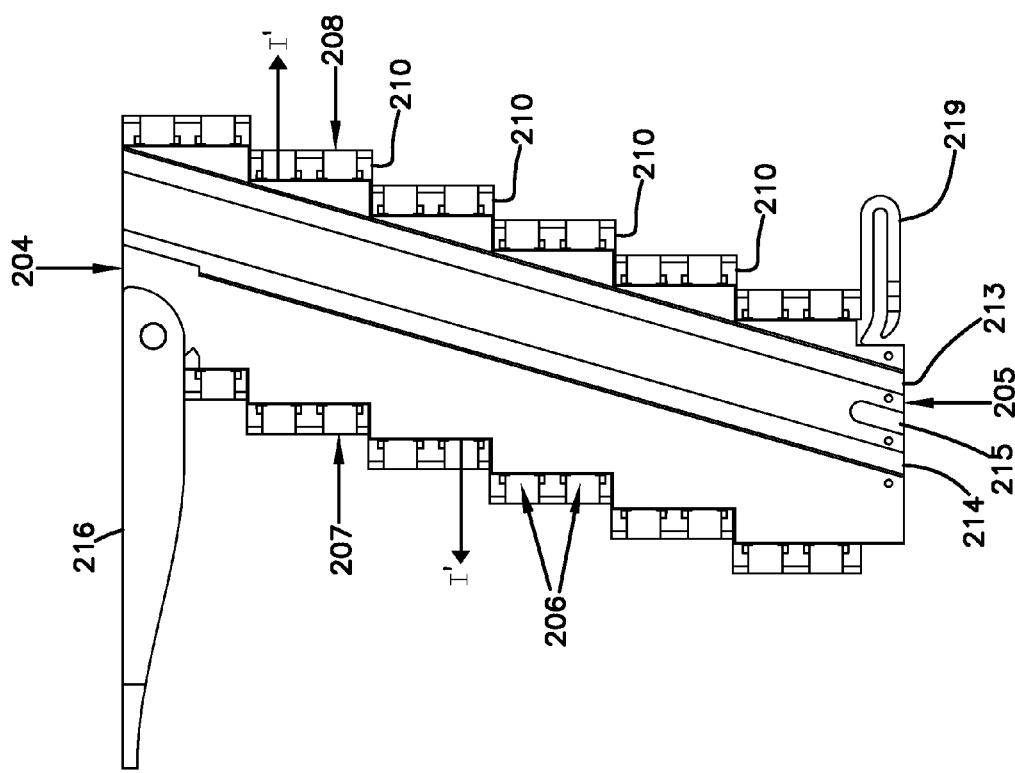
FIG. 34 is a first side elevational view of the first example adapter module of FIG. 31.

As shown in FIG. 33, the module housing 201 of the adapter module 200 may be formed from two or more separate pieces to accommodate the media reading interfaces. In some implementations, the module housing 201 includes an adapter block 220 and a separately formed cover 230. The cover 230 secures to the adapter block 220 (e.g., via fasteners, latches, pegs, etc.) to form the module housing 201. When secured together, the adapter block 220 defines the first side 202 of the module housing 201 and the cover 230 defines the second side 203. Accordingly, the adapter block 220 defines a first set 222 of guide rails 212, a first rotation pin 223, and a first stop edge 224. The cover 230 defines a second set 232 of guide rails 212, a second rotation pin 233, and a second stop edge 234.

In some implementations, the adapter block 220 defines the passages 206 and holds the ferrule alignment devices (e.g., split sleeves). The adapter block 220 also forms the locking tab 219. In other implementations, the adapter block 220 and cover 230 may each define channels that cooperate to define the passages 206 and/or the locking tab 219. In certain implementations, the connector latching notches 209 formed at the adapter ports are positioned adjacent the cover 230. Accordingly, the thickness of the cover 230 provides space to facilitate grasping the latching arms of connectors 130 received at the adapter ports.

Figure 58:
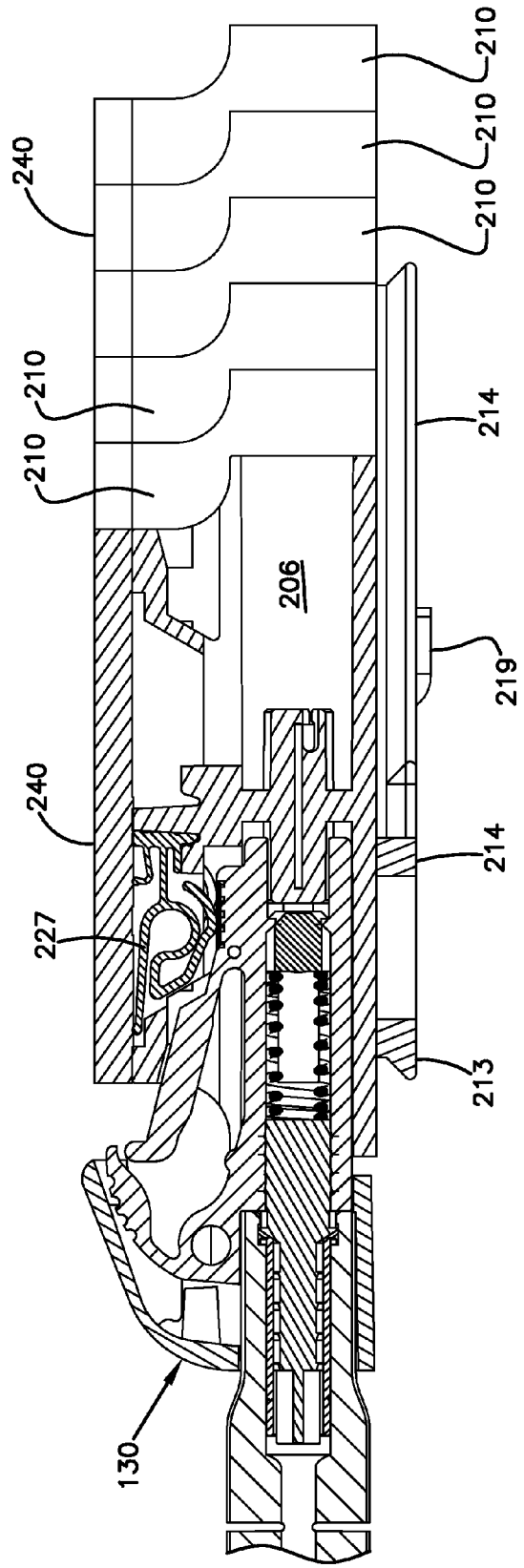
FIG. 58 is a cross-sectional view of the second adapter module of FIGS. 31-39 showing an LC-type fiber optic connector engaging a contact member of a media reading interface of the second example adapter module in accordance with aspects of the disclosure.

One or more media reading interfaces may be positioned in the adapter block 220. In certain implementations, one or more slots 226 may be defined in an exterior surface 225 of the adapter block 220 to provide access to the media reading interfaces. Certain types of media reading interfaces include one or more contact members 227 that are positioned in the slots 226. As shown in FIG. 58, a portion of each contact member 227 extends into a respective one of the passages 206 to engage memory contacts on a fiber optic connector 130. Another portion of each contact member 227 also extends out of the slot 226 to contact a circuit board 240.

In some implementations, the circuit board 240 is held between the termination block 220 and the cover 230. For example, fasteners may extend through the cover 230, through the circuit board 240, and into the termination block 220 to secure the pieces together. In other implementations, the circuit board 240 may be molded integrally formed with the cover 230, which is then secured to the termination block 220. In the example shown, the circuit board 240 has a body having the same stepped-configuration as the adapter block 220 and cover 230. In other implementations, the circuit board 240 may be smaller than the adapter block 220 and cover 230. In still other implementations, multiple circuit boards 240 may be held between the termination block 220 and cover 230.

Non-limiting examples of media reading interface contact members and a description of how such contact members obtain physical layer information from fiber optic connectors can be found in U.S. application Ser. No. 13/025,841, which is incorporated by reference above.

Figure 56:
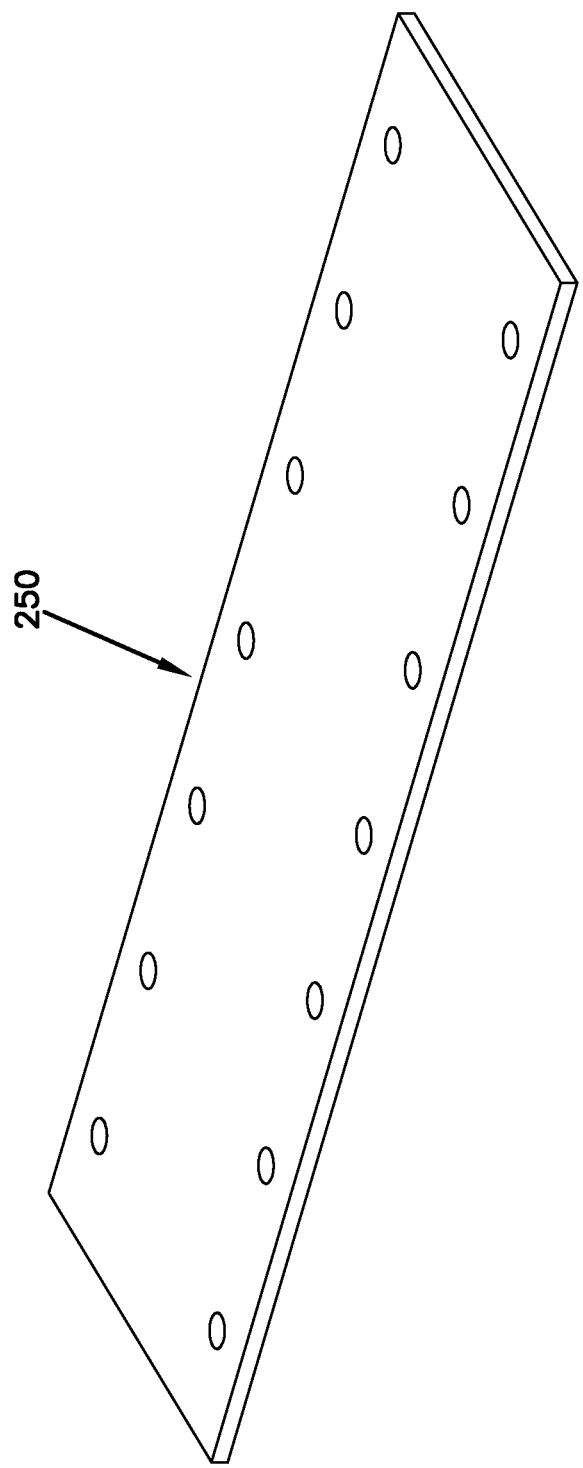
FIG. 56 shows one example circuit board suitable for use as a master circuit board in a termination arrangement in accordance with the principles of the present disclosure.

In some implementations, the walls 140 may define conductive paths that are configured to connect the media reading interfaces of the adapter modules 200 with a master circuit board 250 (FIG. 56). The master circuit board 250 may include or connect (e.g., over a network) to a processing unit that is configured to manage physical layer information obtained by the media reading interfaces. In some implementations, the master circuit board 250 may extend between two or more walls 140. For example, as shown in FIG. 3, the master circuit board 250 may extend across a bottom of each wall 140 in a termination arrangement 110.

In some implementations, the conductive paths may run along one or both exterior side surfaces of the walls 140 between the top and bottom of the walls 140. The conductive paths are located so that a media reading interface for each passage 206 of the adapter module 200 intersects at least one of the conductive paths. Certain types of walls 140 include at least three conductive paths (e.g., one for power, one for ground, and one for data). Certain types of walls 140 include at least four conductive paths. Certain types of walls 140 include a conductive path for each contact member 227 of each media reading interface of the adapter module 200.

Other types of walls 140 include a conductive path for each contact member 227 within a single media reading interface. For example, in some implementations, a first contact member of each media reading interface of an adapter module 200 may connect to a first conductive path; a second contact member of each media reading interface of the adapter module 200 may connect to a second conductive path; and a third contact member of each media reading interface of the adapter module 200 may connect to a third conductive path. Communication between the contact members 227 and the master circuit board 250 may occur in a serial bus configuration (e.g., a CAN bus). In some such implementations, the media reading interfaces of an adapter module 200 remain connected to the master circuit board 250 while the adapter module 200 is moved between the non-extended and extended positions.

Having described the preferred aspects and embodiments of the present invention, modifications and equivalents of the disclosed concepts may readily occur to one skilled in the art. However, it is intended that such modifications and equivalents be included within the scope of the claims which are appended hereto.

The invention claimed is:

1. A fiber optic adapter assembly comprising:
a wall arrangement including at least a first wall and a second wall, the first and second walls defining opposing sets of grooves, each set of grooves including a first groove, a second groove, and a third groove, the second groove being disposed between the first groove and the third groove; and
a module housing defining a plurality of passages, each passage defining first and second ports configured to receive fiber optic connectors, the module housing defining a first set of guide rails at a first side of the module housing and a second set of guide rails at a second side of the module housing, each set of guide rails being disposed between the first and second ports of each passage, each set of guide rails including a first guide rail, a second guide rail, and a guide extension, the guide extension being disposed between the first guide rail and the second guide rail, and the guide rails of the first set of guide rails being parallel with each other and the guide rails of the second set of guide rails being parallel with each other, the guide rails of the module housing being configured to be slidably received in the grooves of the first and second walls;
wherein the first guide rail of each set of guide rails is slidably received in the first groove of the respective wall, the guide extension of each set of guide rails is slidably received in the second groove of the respective wall, and the second guide rail of each set of guide rails is slidably received in the third groove of the respective wall.

2. The fiber optic adapter assembly according to claim 1, wherein the fiber optic adapter ports are configured for interconnecting LC-type fiber optic connectors.

3. The fiber optic adapter assembly according to claim 2, wherein the module housing defines twelve adapter ports.

4. The fiber optic adapter assembly according to claim 1, wherein the module housing has a stepped configuration with two passages defined at each step.

5. The fiber optic adapter assembly according to claim 1, wherein the guide extension is disposed between the first and second guide rails.

6. The fiber optic adapter assembly according to claim 1, wherein the guide extension is substantially shorter than the first and second guide rails.

7. The fiber optic adapter assembly according to claim 1, further comprising a handle that is pivotally coupled to one end of the module housing to facilitate sliding the module housing along the grooves of the first and second walls.

8. The fiber optic adapter assembly according to claim 7, wherein the handle is configured to pivot between a first position, in which the handle extends generally parallel to insertion axes of the ports, and a second position, in which the handle extends generally parallel to the guide rails of the module housing.

9. The fiber optic adapter assembly according to claim 8, wherein the handle is configured to pivot towards the user when moved from the first position to the second position.

10. The fiber optic adapter assembly according to claim 7, further comprising a locking tab that cooperate with the walls to releasably secure the module housing in a non-extended position.

11. The fiber optic adapter assembly according to claim 10, wherein the handle is located on an opposite side of the guide rails from the locking tab.

12. The fiber optic adapter assembly according to claim 10, wherein the locking tab is located at a common end of the module housing as the guide extension.

13. The fiber optic adapter assembly according to claim 1, wherein each port has a major dimension and a minor dimension that is smaller than the major dimension, wherein the ports are lined up along their minor dimensions to form a length of the module housing.

14. The fiber optic adapter assembly according to claim 1, wherein a length of the module housing ranges from about 3 inches to about 3.3 inches.

15. The fiber optic adapter assembly according to claim 14, wherein the length of the module housing ranges from about 3.1 inches to about 3.2 inches.

16. The fiber optic adapter assembly according to claim 15, wherein the length of the module housing is about 3.16 inches.

17. The fiber optic adapter assembly according to claim 16, wherein the module housing defines twelve adapter ports.

18. The fiber optic adapter assembly according to claim 1, wherein the module housing has a width that ranges from about 0.5 inches to about 1 inch.

19. The fiber optic adapter assembly according to claim 18, wherein the width of the module housing ranges from about 0.6 inches to about 0.8 inches.

20. The fiber optic adapter assembly according to claim 19, wherein the width of the module housing is about 0.68 inches.

21. The fiber optic adapter assembly according to claim 20, wherein the module housing defines twelve adapter ports.

22. The fiber optic adapter assembly according to claim 1, wherein a length of the module housing ranges from about 3 inches to about 3.3 inches and a width of the module housing ranges from about 0.5 inches to about 1 inch.

23. The fiber optic adapter assembly according to claim 22, wherein the length of the module housing is about 3.16 inches and the width of the module housing is about 0.68 inches.

24. The fiber optic adapter assembly according to claim 1, wherein the module housing is configured to hold a plurality of contacts that couple to a printed circuit board mounted to the module housing.

25. The fiber optic adapter assembly according to claim 1, wherein the wall arrangement also includes a plurality of additional walls, each of the additional walls defining opposing sets of grooves, each set of grooves including a first groove, a second groove, and a third groove.

26. The fiber optic adapter assembly according to claim 25, further comprising a plurality of additional module housings, each additional module housing defining a plurality of passages, each passage defining first and second ports configured to receive fiber optic connectors, each module housing defining a first set of guide rails at a first side of the module housing and a second set of guide rails at a second side of the module housing, each set of guide rails including a first guide rail, a second guide rail, and a guide extension, the guide rails of each module housing being configured to be slidably received in the grooves of two of the walls.

27. A fiber optic adapter assembly comprising a module housing defining a plurality of passages, each passage defining first and second ports configured to receive fiber optic connectors, the module housing defining a first set of guide rails at a first side of the module housing and a second set of guide rails at a second side of the module housing, each set of guide rails being disposed between the first and second ports of each passage, each set of guide rails including a first guide rail, a second guide rail, and a guide extension, the guide extension being disposed between the first guide rail and the second guide rail, and the guide rails of the first set of guide rails being parallel with each other and the guide rails of the second set of guide rails being parallel with each other.

* * * * *